(12) United States Patent
Chan et al.

(10) Patent No.: US 7,580,451 B2
(45) Date of Patent: Aug. 25, 2009

(54) DECODING OF WALSH CODES

(75) Inventors: Albert M. Chan, Brighton, MA (US);
Jon Feldman, New York, NY (US);
Raghavendra Madyastha, Arlington, MA (US); Piotr Indyk, Cambridge, MA (US); David Karger, Cambridge, MA (US)

(73) Assignee: Vanu, Inc., Cambridge, MA (US)

( * ) Notice: Subject to any disclaimer, the term of this patent is extended or adjusted under 35 U.S.C. 154(b) by 45 days.

(21) Appl. No.: 11/543,459

(22) Filed: Oct. 5, 2006

(65) Prior Publication Data

US 2008/0037615 A1     Feb. 14, 2008

Related U.S. Application Data

(60) Provisional application No. 60/725,176, filed on Oct. 7, 2005.

(51) Int. Cl.
*H04B 1/707* (2006.01)
*H04J 13/04* (2006.01)

(52) U.S. Cl. .................. 375/150; 375/142; 375/147; 370/209

(58) Field of Classification Search .......... 375/142, 375/144, 147, 148, 150, 260; 370/209, 320, 370/335, 342
See application file for complete search history.

(56) References Cited

U.S. PATENT DOCUMENTS

| | | | |
|---|---|---|---|
| 5,465,269 A | 11/1995 | Schaffner et al. | |
| 5,805,633 A | 9/1998 | Uddenfeldt | |
| 5,901,182 A | 5/1999 | Kot | |
| 5,931,964 A | 8/1999 | Beming et al. | |
| 5,973,643 A | 10/1999 | Hawkes et al. | |
| 6,016,322 A | 1/2000 | Goldman | |
| 6,035,207 A | 3/2000 | Wang et al. | |
| 6,154,507 A | 11/2000 | Bottomley | |
| 6,208,615 B1 * | 3/2001 | Faruque et al. | 370/209 |
| 6,285,876 B1 | 9/2001 | Zhong | |
| 6,356,911 B1 | 3/2002 | Shibuya | |
| 6,381,726 B1 | 4/2002 | Weng | |
| 6,442,392 B2 | 8/2002 | Ruutu et al. | |
| 6,490,327 B1 | 12/2002 | Shah | |
| 6,546,256 B1 | 4/2003 | Maloney et al. | |
| 6,560,462 B1 | 5/2003 | Ravi et al. | |
| 6,621,807 B1 | 9/2003 | Jung et al. | |
| 6,631,142 B2 | 10/2003 | Miyamoto et al. | |
| 6,731,674 B1 * | 5/2004 | Yang et al. | 375/146 |
| 6,757,544 B2 | 6/2004 | Rangarajan et al. | |
| 6,788,750 B1 | 9/2004 | Reuven et al. | |
| 6,915,123 B1 | 7/2005 | Daudelin et al. | |
| 6,920,125 B1 | 7/2005 | Wu | |
| 6,978,124 B2 | 12/2005 | Benes et al. | |
| 6,987,798 B2 | 1/2006 | Ahn et al. | |
| 7,013,150 B2 | 3/2006 | Okanoue et al. | |
| 7,068,638 B2 | 6/2006 | Choi et al. | |

(Continued)

OTHER PUBLICATIONS

International Search Report, PCT/US03/36709, mailed on May 25, 2004, 4 pgs.

(Continued)

*Primary Examiner*—Young T. Tse
(74) *Attorney, Agent, or Firm*—Fish & Richardson P.C.

(57) ABSTRACT

Methods, systems, devices, and computer program products for decoding of Walsh codewords are disclosed.

34 Claims, 21 Drawing Sheets

U.S. PATENT DOCUMENTS

| | | |
|---|---|---|
| 2003/0012265 A1 | 1/2003 | Lin |
| 2003/0063595 A1 | 4/2003 | You et al. |
| 2003/0235240 A1 | 12/2003 | Kawamoto et al. |
| 2004/0062214 A1 | 4/2004 | Schnack et al. |
| 2004/0114623 A1 | 6/2004 | Smith |
| 2004/0209580 A1 | 10/2004 | Steinheider et al. |
| 2004/0252665 A1 | 12/2004 | Clark et al. |
| 2004/0259571 A1 | 12/2004 | Joshi |
| 2004/0264553 A1* | 12/2004 | McDonough et al. ....... 375/147 |
| 2005/0163075 A1 | 7/2005 | Malladi et al. |
| 2005/0195732 A1* | 9/2005 | Huh et al. .................. 370/206 |
| 2005/0228854 A1 | 10/2005 | Steinheider et al. |
| 2005/0286536 A1 | 12/2005 | Steinheider et al. |
| 2006/0007919 A1 | 1/2006 | Steinheider et al. |

OTHER PUBLICATIONS

Cormen et al., 2001, Introduction to Algorithms Second Edition, McGraw-Hill, Boston.

Ekroot, L. and Dolinar, S., "A* Decoding of Block Codes", *IEEE Transactions on Communications*, vol. 44 (9):1052-1056 (1996).

Fano, "A Heuristic Discussion of Probabilistic Decoding", *IEEE Transactions on Information Theory*, vol. IT9(1):64-74 (1963).

Forney, Jr., "Convolutional Codes II. Maximum-Likelihood Decoding", *Information and Control*, vol. 25:222-266 (1974).

Forney, Jr., "The Viterbi Algorithm", *Proceedings of the IEEE*, vol. 61(3):268-278 (1973).

Han et al., "Efficient Priority-First Search Maximum-Likelihood Soft-Decision Decoding of Linear Block Codes", *IEEE Transactions on Information Theory*, vol. 39(5):1514-1523 (1993).

Han et al., "A Maximum-Likelihood Soft-Decision Sequential Decoding Algorithm for Binary Convolutional Codes", *IEEE Transactions on Communications*, vol. 50(2):173-178 (2002).

Heller, J. and Jacobs, I. M., "Viterbi Decoding for Satellite and Space Communication", *IEEE Transactions on Communication Technology*, vol. Com-19(5):835-848 (1971).

Kang, G. and Zhang, P., "The Implementation of Viterbi Decoder on TMS320C6201 DSP in WCDMA System", *Beijing University of Posts and Telecommunications* .

Rajagopal, S., "A Real-Time Baseband Communications Processor for High Data Rate Wireless Systems", Dept. of Electrical and Computer Engineering, Rice University (2002).

Sereni et al., "A Software Re-Configurable Architecture for 3G and Wireless Systems", University of Perugia, Italy (2000).

Varga, R. and Harrison, M. (eds), The Art of Computer Programming-Second Edition, Addison-Wesley, Massachusetts (1973).

Viterbi, "Error Bounds for Convolutional Codes and an Asymptotically Optimum Decoding Algorithm", *IEEE Transactions on Information Theory*, vol. IT-13(2):260-269 (1967).

Wicker, S. B., Error Control Systems for Digital Communication and Storage, Prentice Hall, Englewood Cliffs, NJ (1995).

International Search Report—PCT/US03/25218.

M. Abramowitz, et al, *Handbook of Mathematical Functions with Formulas, Graphs and Mathematical Tables*, Dover Publications, New York, 1965.

J.L. Massey, *Threshold Decoding*, Technical Report 410, MIT Press, Cambridge, MA, 1963.

K. Paterson, et al., *Efficient Decoding Algorithms for Generalised Reed-Muller Codes*, Technical Report, Hewlett-Packard Labs, Nov. 1998.

Bob Pearson, *Complementary Code Keying Made Simple*, Application Note 9850, http://www/intersil.com/data/an/an9/an9850/an9850.pdf, May 2000.

I. Reed, *A Class of Multiple-Error-Correcting Codes and the Decoding Scheme*, IRE Transactions on Information Theory, PGIT-4:38-49, Sep. 1954.

R. van Nee, *OFDM Codes for Peak-to-Average Power Reduction and Error Correction*, In Proc. IEEE Globecom '96, London, England, pp. 740-744, Nov. 1996.

G.N. Watson, *A Treatise on the Theory of Bessel Functions*, Second Edition, Cambridge University Press, 1952.

International Search Report PCT/US03/25219 mailed Dec. 16, 2003.

http://www.fcc.gov/911/enhanced/.

http://www.arraycomm.com/.

International Search Report, PCT/US05/07136, mailed on Dec. 26, 2006, 6 pgs.

EIA/TIA/IS-95 Mobile Station-Base Station Compatibility Standard for Dual-Mode Wideband Spread Spectrum Cellular System, Telecommunications Industry Association, Jul. 1993, pp. 6-1 to 6-8.

L. Trevisan, "Some Applications of Coding Theory in Computational Complexity," Quaderni di Matematica, vol. 13, pp. 347-424, 2004.

J.S. Lee and L.E. Miller, CDMA Systems Engineering Handbook, Artech House, Boston, 1998.

A.J. Viterbi, CDMA: Principles of Spread Spectrum Communication, Addison-Wesley, Reading, MA, 1995.

R.K. Yarlagadda and J.E. Hershey, Hadamard Matrix Analysis and Synthesis, with Applications to Communications and Signal/Image Processing, Kluwer Academic, Boston, 1997.

A.V. Oppenheim and R.W. Shafer, with J.R. Buck, Discrete-Time Signal Processing, 2nd ed., Prentice Hall, Upper Saddle River, NJ, 1999.

V.S. Pless and W.C. Huffman, Eds., Handbook of Coding Theory, vol. 1, Elsevier Science, Amsterdam, 1998.

S.J. MacMullan and O.M. Collins, "A Comparison of Known Codes, Random Codes, and the Best Codes," IEEE Transactions on Information Theory, vol. 44, No. 7, pp. 3009-3022, Nov. 1998.

M. Luby, "LT-codes," in Proceedings of the 43rd Annual IEEE Symposium on the Foundations of Computer Science (FOCS), pp. 271-280, 2002.

A. Shokrollahi, "Raptor codes," in Proceedings of the IEEE International Symposium on Information Theory, p. 36, 2004.

* cited by examiner

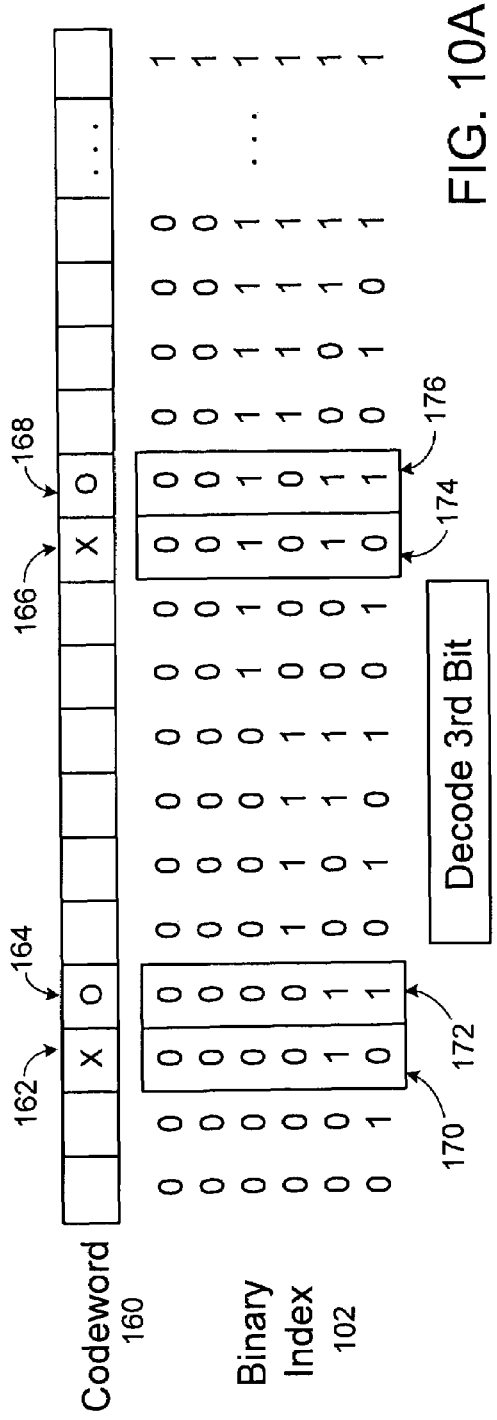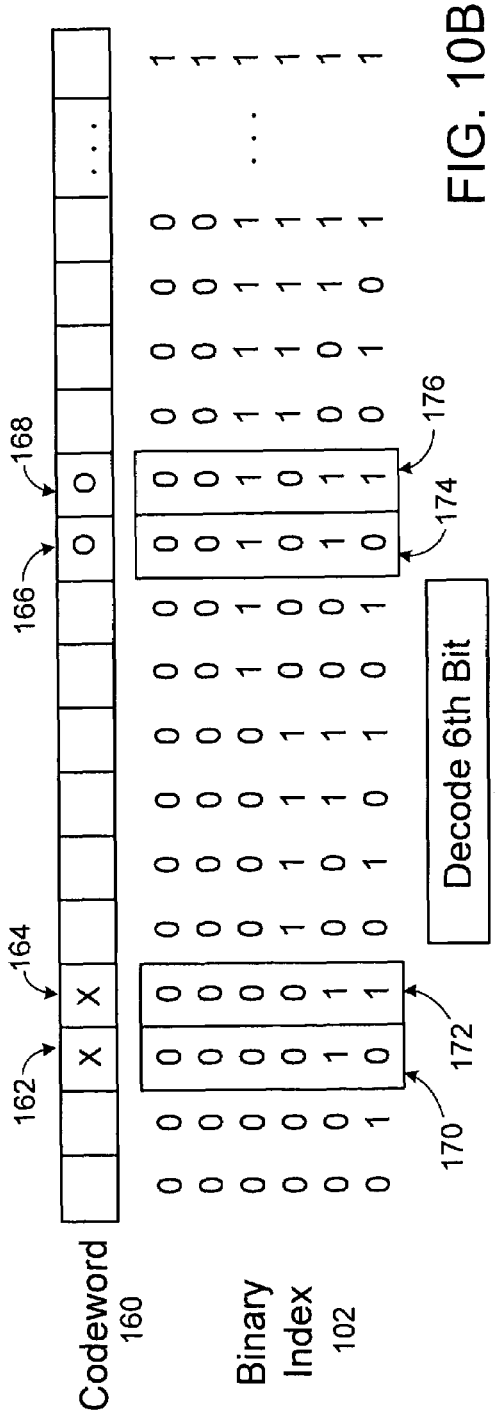

DECODING OF WALSH CODES

PRIORITY TO OTHER APPLICATIONS

This application claims priority from and incorporates herein U.S. Provisional Application No. 60/725,176, filed Oct. 7, 2005, and titled "Local Decoding of Walsh Codes".

TECHNICAL FIELD

The following description relates to local decoding of Walsh codewords to reduce the computation complexity for code division multiple access (CDMA) de-spreading and Walsh decoding.

BACKGROUND

In a cellular system voice, data, and signaling traffic is sent between mobile devices and a base station located at a cell tower site. The voice, data, and signaling traffic is backhauled from the base station at the cell tower site to a base station controller and a mobile switching center.

Various communication standards can be used to send the signals from the mobile devices to the base station. One exemplary communication standard is code division multiple access (CDMA). CDMA is a form of multiplexing that does not divide up the channel by time (as in TDMA), or frequency (as in FDMA), but instead encodes data with a special code associated with each channel.

SUMMARY

In some aspects, a method includes receiving, at a base station, a Walsh codeword from a mobile device. The Walsh codeword includes a plurality of entries and represents a plurality of bits. The method also includes estimating at least one bit of the plurality of bits based on a set of fewer than all of the entries of the Walsh codeword.

Embodiments can include one or more of the following.

The method can include de-spreading at least some of the entries of the Walsh codeword. De-spreading at least some of the entries can include de-spreading fewer than all of the entries of the Walsh codeword. De-spreading at least some of the entries can include multiplying the entries by a mobile-specific code.

The received Walsh codeword can be a non-coherent signal. Receiving the Walsh codeword from the mobile device can include receiving an in-phase component of the Walsh codeword and receiving a quadrature component of the Walsh codeword.

Estimating the at least one bit of the plurality of bits can include estimating a single bit based on two de-spread entries from the Walsh codeword. Despreading the entries can include despreading only two entries of the Walsh codeword.

Estimating the at least one bit of the plurality of bits can include estimating p bits based on $2^p$ de-spread entries from the Walsh codeword. Estimating the at least one bit of the plurality of bits can include estimating two bits based on four de-spread entries from the Walsh codeword. Estimating the at least one bit of the plurality of bits can include estimating three bits based on eight de-spread entries from the Walsh codeword.

The method can include selecting a first entry from the plurality of entries included in the Walsh codeword. The first entry can be associated with a first column in a generator matrix. The method can also include selecting a second entry from the plurality of entries included in the Walsh codeword. The second entry can be associated with a second column in a generator matrix. The second column can differ from the first column by a single bit. The method can also include de-spreading the first and second entries.

Estimating at least one bit of the plurality of bits can include multiplying the first entry and the second entry. Receiving the Walsh codeword from the mobile device can include receiving an in-phase component of the Walsh codeword and receiving a quadrature component of the Walsh codeword. Multiplying the first entry and the second entry can include multiplying the first entry from the in-phase component by the second entry from the in-phase component to generate an in-phase multiplication result and multiplying the first entry from the quadrature component by the second entry from the quadrature component to generate a quadrature multiplication result.

Estimating the at least one bit of the plurality of bits can include adding the in-phase and quadrature multiplication results.

Estimating the at least one bit of the plurality of bits can include simultaneously estimating two bits of the plurality of bits based on four de-spread entries from the Walsh codeword. The method can also include selecting a first entry from the plurality of entries included in the Walsh codeword. The first entry can be associated with a first column in a generator matrix. The method can also include selecting a second entry from the plurality of entries included in the Walsh codeword. The second entry can be associated with a second column in the generator matrix. The method can also include selecting a third entry from the plurality of entries included in the Walsh codeword. The third entry can be associated with a third column in the generator matrix. The method can also include selecting a fourth entry from the plurality of entries included in the Walsh codeword. The fourth entry can be associated with a fourth column in the generator matrix. The first, second, third, and fourth columns in the generator matrix can differ in two bit locations. The method can also include de-spreading the first, second, third, and fourth entries.

Receiving the Walsh codeword from the mobile device can include receiving an in-phase component of the Walsh codeword and receiving a quadrature component of the Walsh codeword. Estimating the at least one bit of the plurality of bits can include performing a fast Hadamard transform (FHT) on the in-phase and quadrature components of the selected bits to generate a first in-phase result, a second in-phase result, a third in-phase result, a fourth in-phase result, a first quadrature result, a second quadrature result, and a third quadrature result, and a fourth quadrature result.

The method can also include squaring the first in-phase result to generate a first squared in-phase output, squaring the second in-phase result to generate a second squared in-phase output, squaring the third in-phase result to generate a third squared in-phase output, squaring the fourth in-phase result to generate a fourth squared in-phase output, squaring the first quadrature result to generate a first squared quadrature output, squaring the second quadrature result to generate a second squared quadrature output, squaring the third quadrature result to generate a third squared quadrature output, and squaring the fourth quadrature result to generate a fourth squared quadrature output. The method can also include adding the first squared in-phase output and the first squared quadrature output, adding the second squared in-phase output and the second squared quadrature output, adding the third squared in-phase output and the third squared quadrature output, and adding the fourth squared in-phase output and the fourth squared quadrature output.

Estimating the at least one bit of the plurality of bits can include simultaneously estimating all six bits of the plurality of bits based on the de-spread entries from the Walsh codeword. The method can also include selecting a predetermined number of entries from the Walsh codeword and de-spreading only the selected entries.

Selecting a predetermined number of entries from the Walsh codeword can include randomly selecting a predetermined number of entries from the Walsh codeword. The predetermined number of entries can be at most about sixteen entries. The predetermined number of entries can be at most about thirty-two entries. The predetermined number of entries can be at most about sixty-three entries. Estimating all six bits can include performing a fast Hadamard transform (FHT) on the selected entries.

The method can also include generating a reliability metric based on the estimated at least one bit and comparing the reliability metric to a threshold. The method can also include iteratively re-estimating the at least one bit if the reliability metric does not meet the threshold. The method can also include altering the threshold based on a number of times the at least one bit has been re-estimated.

The base station and the mobile device can communicate using an IS-95 protocol.

In some aspects, a system includes a receiver and a processor. The receiver is configured to receive a Walsh codeword from a mobile device. The Walsh codeword includes a plurality of entries and representing a plurality of bits. The processor is configured to estimate at least one bit of the plurality of bits based on a set of fewer than all of the entries of the Walsh codeword.

Embodiments can include one or more of the following.

The processor can be further configured to de-spread fewer than all of the entries of the Walsh codeword. The processor can be configured to estimate p bits based on $2^p$ de-spread entries from the Walsh codeword. The processor can be configured to simultaneously estimate all six bits of the plurality of bits based on the de-spread entries from the Walsh codeword.

In some aspects a computer program product is tangibly embodied in an information carrier. The computer program product includes instructions to cause a machine to receive a Walsh codeword from a mobile device. The Walsh codeword includes a plurality of entries and representing a plurality of bits. The computer program product also includes instructions to estimate at least one bit of the plurality of bits based on a set of fewer than all of the entries of the Walsh codeword.

Embodiments can include one or more of the following.

The computer program product can include instructions to de-spread fewer than all of the entries of the Walsh codeword. The computer program product can include instructions to estimate p bits based on $2^p$ de-spread entries from the Walsh codeword. The computer program product can include instructions to simultaneously estimate all six bits of the plurality of bits based on the de-spread entries from the Walsh codeword.

BRIEF DESCRIPTION OF THE DRAWINGS

FIG. 10A is a diagram of a codeword and a generator matrix.
FIG. 10B is a diagram of a codeword and a generator matrix.

DETAILED DESCRIPTION

Figure 1:
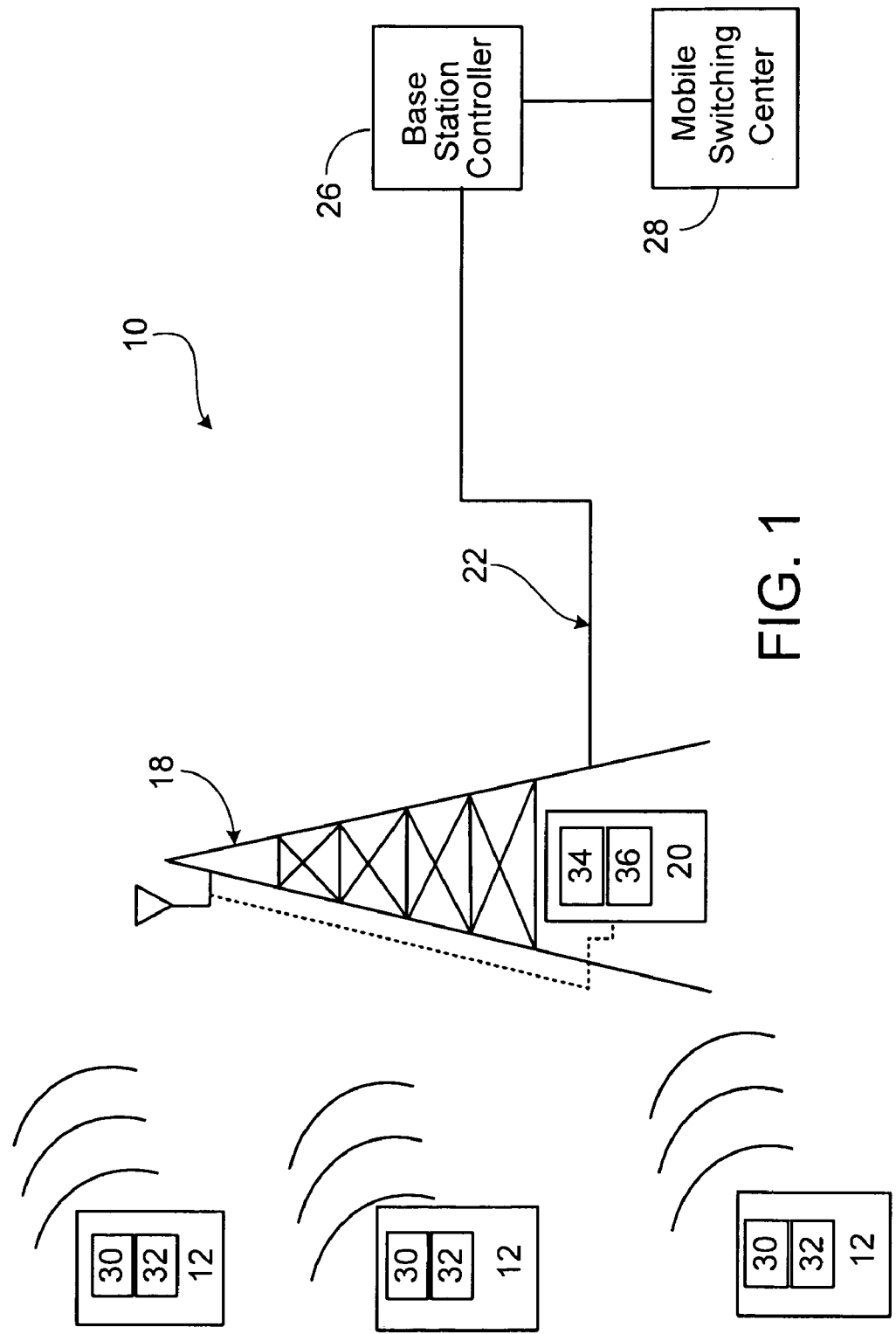
FIG. 1 is a block diagram of a cellular system.

As shown in FIG. 1, in a cellular system 10, voice, data, and signaling traffic is sent between mobile devices 12 and a base station 20 located at a cell tower site 18. The voice, data, and signaling traffic is backhauled from the base station 20 at the cell tower site 18 to a base station controller 26 and a mobile switching center 28.

The mobile units 12 each include a transmitter 30 and a receiver 32 and the base station 20 includes a transmitter 34 and a receiver 36. The base station 20 is configured to receive communication signals from multiple mobile devices 12 that communicate with the base station 20 using a CDMA communication standard. During use, the transmitter 30 of the mobile device 12 encodes voice, data, and signaling traffic and sends the voice, data, and signaling traffic to receiver 36 of the base station 20. Since system 10 uses a CDMA communication standard, each of the mobile devices 12 encodes communications sent to the base station 20 with a unique code associated with the channel. The base station 20 uses the special codes to differentiate the signals received from the different mobile devices 12.

Figure 2:
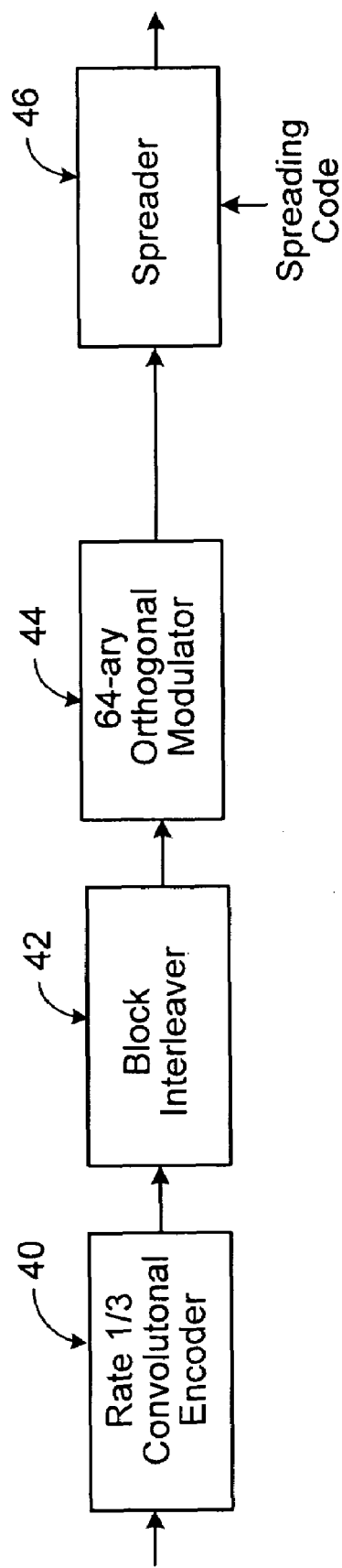
FIG. 2 is a block diagram of exemplary components of a transmitter.

As shown in FIG. 2, the transmitter 30 included in the mobile unit 12 includes an encoder 40, a block interleaver 42, a modulator 44, and a spreader 46. The encoder 40, block interleaver 42, modulator 44, and spreader 46 format communications into Walsh codewords and spread the Walsh codewords using a unique code so that the signal can be identified and decoded by the receiver 36 in the base station 20.

Figure 3:
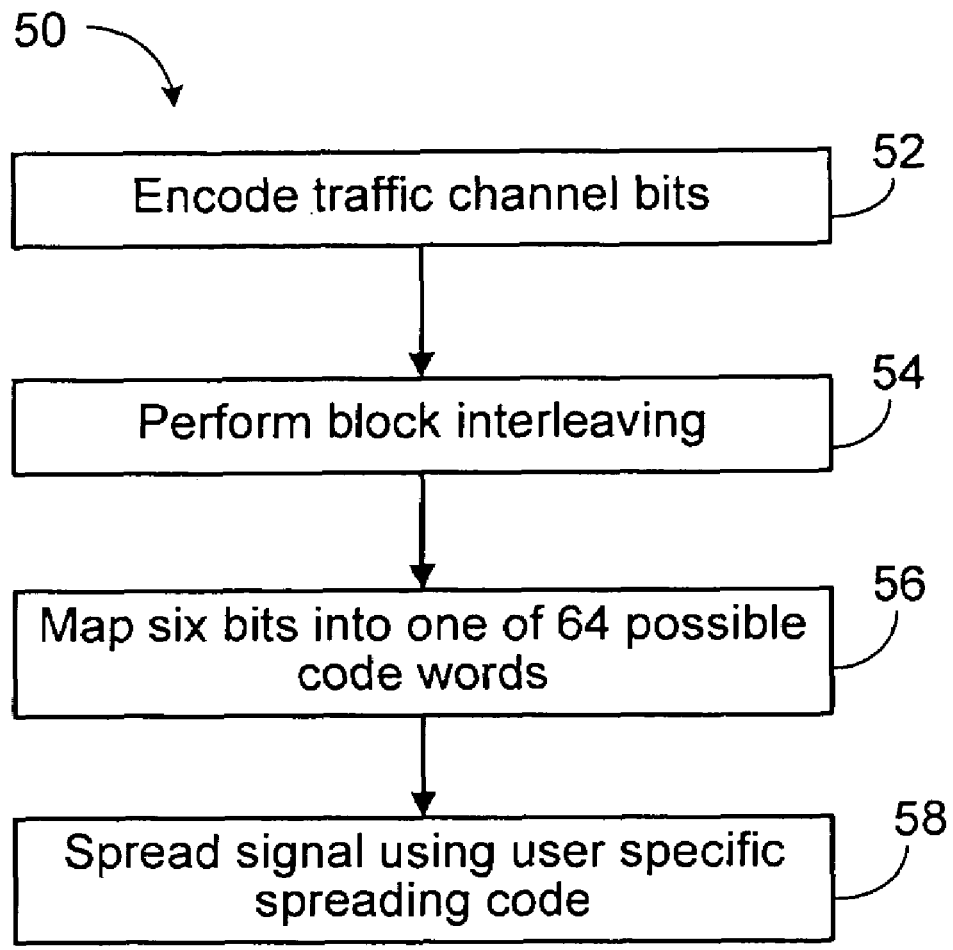
FIG. 3 is a flow chart of an encoding process.

FIG. 3 shows an exemplary encoding process 50 used by transmitter 30 to encode data. The encoder 40 encodes traffic and access channel bits using a rate-1/3 convolutional encoding scheme (52). After encoding the bits, the block interleaver 42 performs block interleaving (54). The block interleaving arranges the data in a non-contiguous way in order to protect the transmission against burst errors. After interleaving, modulator 44 maps the coded bits (six bits at a time) into one of sixty-four possible Walsh codewords (56). The Walsh codewords are sixty-four bits in length. This modulation provides additional coding (or spreading) gain and simplifies noncoherent detection of the data at the base station. All of the Walsh codewords are mutually orthogonal, which makes their detection robust in a noncoherent system, in which carrier phase is unknown.

The spreader 46 spreads the Walsh codeword based on a spreading code assigned to the specific user (58). More particularly, each bit of the 64-bit Walsh codeword is multiplied by the unique spreading code. After spreading the signal based on the unique spreading code, a quadrature spreading and modulation structure included in the spreader 46 multiples the signal by in-phase and quadrature-phase codes. The quadrature-phase signal is delayed by half a cycle in comparison to the in-phase signal. The transmitter 30 in the mobile device 12 sends both the quadrature-phase and in-phase signal to the receiver 36 in the base station 20. This redundant transmission of information makes the transmission more robust in the face of noise on the radio frequency (RF) channel and multipath fading.

Local Decoding

Figure 4:
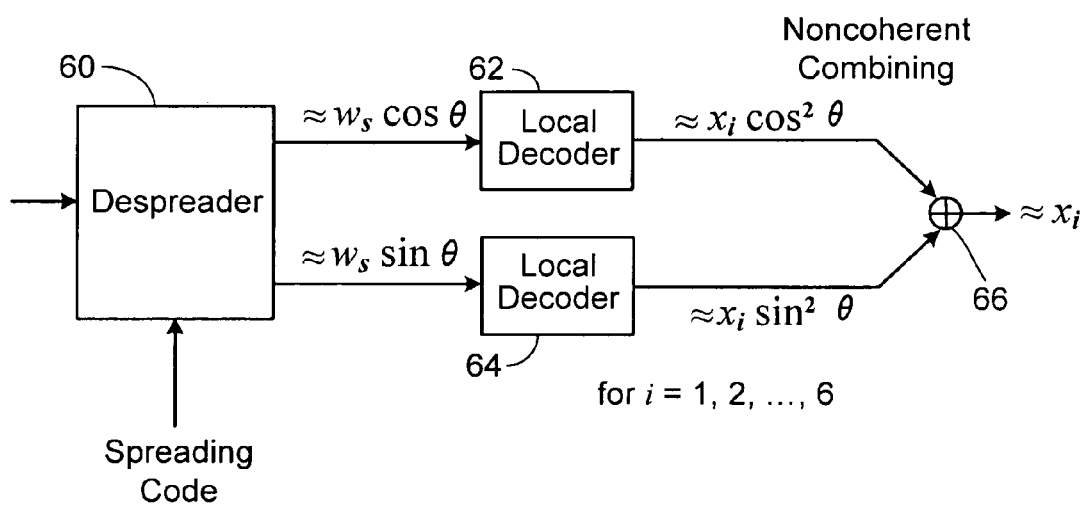
FIG. 4 is a block diagram of exemplary components of a receiver.

As shown in FIG. 4, the receiver 36 included in the base station 20 includes a de-spreader 60, local decoders 62 and 64, and a summing device 66. Receiver 36 receives the encoded Walsh codewords from the mobile device 12 and decodes the Walsh codewords to recover the original six bits of data. Receiver 36 is configured to account for the non-coherent nature (e.g., the phase associated with the received carrier is unknown) of the signal received by the base station 20. In general, the structure of Walsh codewords enables two entries (also referred to as symbols) of the 64-bit codeword to be used to generate an estimate of one of the original six bits of information. Thus, one of the six input bits can be determined by observing two of the sixty-four entries of the received Walsh codeword. This process is referred to herein as local decoding.

Figure 5:
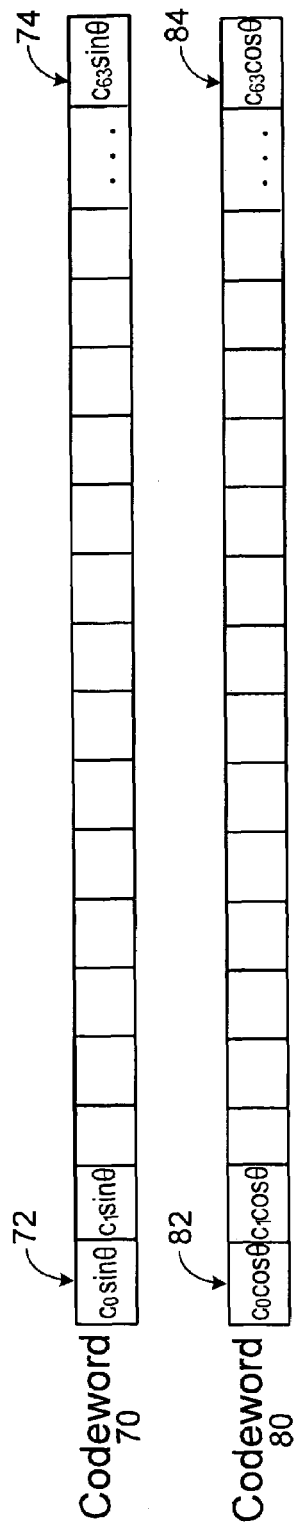
FIG. 5A is a diagram of a codeword and a generator matrix.
FIG. 5B is a diagram of codewords.

As shown in FIG. 5A, the sixty-four entries of the binary codeword are labeled as $C=[C_0, C_1, C_2, \ldots, C_{63}]$, where the subscripts are the decimal values of the corresponding binary column vectors in the generator matrix (G). In general the generator matrix is a 64×6 matrix whose columns are sixty-four distinct 6×1 binary vectors as shown below:

$$G = \begin{bmatrix} 0 & 0 & 0 & 0 & 0 & 0 & & 1 \\ 0 & 0 & 0 & 0 & 0 & 0 & & 1 \\ 0 & 0 & 0 & 0 & 0 & 0 & \ldots & 1 \\ 0 & 0 & 0 & 0 & 1 & 1 & & 1 \\ 0 & 0 & 1 & 1 & 0 & 0 & & 1 \\ 0 & 1 & 0 & 1 & 0 & 1 & & 1 \end{bmatrix}$$

The structure of the generator matrix makes it possible to efficiently decode the Walsh codeword without examining the entire codeword. In order to decode the zeroth bit of $x=[x_0, x_1, x_2, x_3, x_4, x_5]$ in the absence of receiver noise, the value of $x_0$ can be obtained by modulo-2 adding any pair of codeword components $c_i$ and $c_j$ for which the binary representations of i and j (and the corresponding columns in generator matrix) differ only in the zeroth bit position:

$$c_i \oplus c_j = \left(\sum_{s=0}^{5} x_s G_{si}\right) \oplus \left(\sum_{t=0}^{5} x_t G_{tj}\right)$$

$$= \sum_{s=0}^{5} x_s (G_{si} \oplus G_{sj})$$

$$= x_0(G_{0i} \oplus \overline{G_{0i}}) \oplus \sum_{s=1}^{5} x_s (G_{si} \oplus G_{si})$$

$$= x_0.$$

In some embodiments, Walsh codewords are represented in bipolar (±1) format rather than binary format. In such embodiments, the modulo-2 addition is replaced by multiplication of $c_i$ and $c_j$. In local decoding, the two symbols $c_i$ and $c_j$ used to determine the bit $x_t$ are chosen such that the binary representations of i and j in the generator matrix differ only in the $t^{th}$ bit position.

The example provided above in relation to FIG. 5A, assumes a coherent signal. However, in cellular systems the signal received by the receiver 36 at base station 20 is non-coherent. Since the signal is non-coherent, the phase of the signal is not known. As shown in FIG. 5B, since the phase is not known, the receiver 36 receives two codewords 70 and 80 that represent the same 6-bits of encoded data sent from the transmitter 30 of the mobile device 12. The two different codewords 70 and 80 represent the in-phase and quadrature components of the received signal associated with the codeword transmitted by the mobile device 12.

In a non-coherent system, carrier phase (θ) is unknown at the receiver. In codeword 70, each of the sixty-four bits of the codeword are received with a scaling factor of sin(θ). In contrast, in codeword 80 each of the sixty-four bits of the codeword is received with a scaling factor of cos(θ). For example, the first bits of codewords 70 and 80 can be represented as $c_0 \sin(\theta)$ and $c_0 \cos(\theta)$ respectively (as indicated by arrows 72 and 82). Similarly, the last bits of codewords 70 and 80 can be represented as $c_{63} \sin(\theta)$ and $c_{63} \cos(\theta)$ respectively (as indicated by arrows 74 and 84).

As described above, the structure of Walsh codewords enables two symbols of the sixty-four bit codeword to be used to generate an estimate of one of the original six bits of information. In a non-coherent system, the decoding of the received codewords accounts for the non-coherent nature of the received signals as described below.

Figure 6:
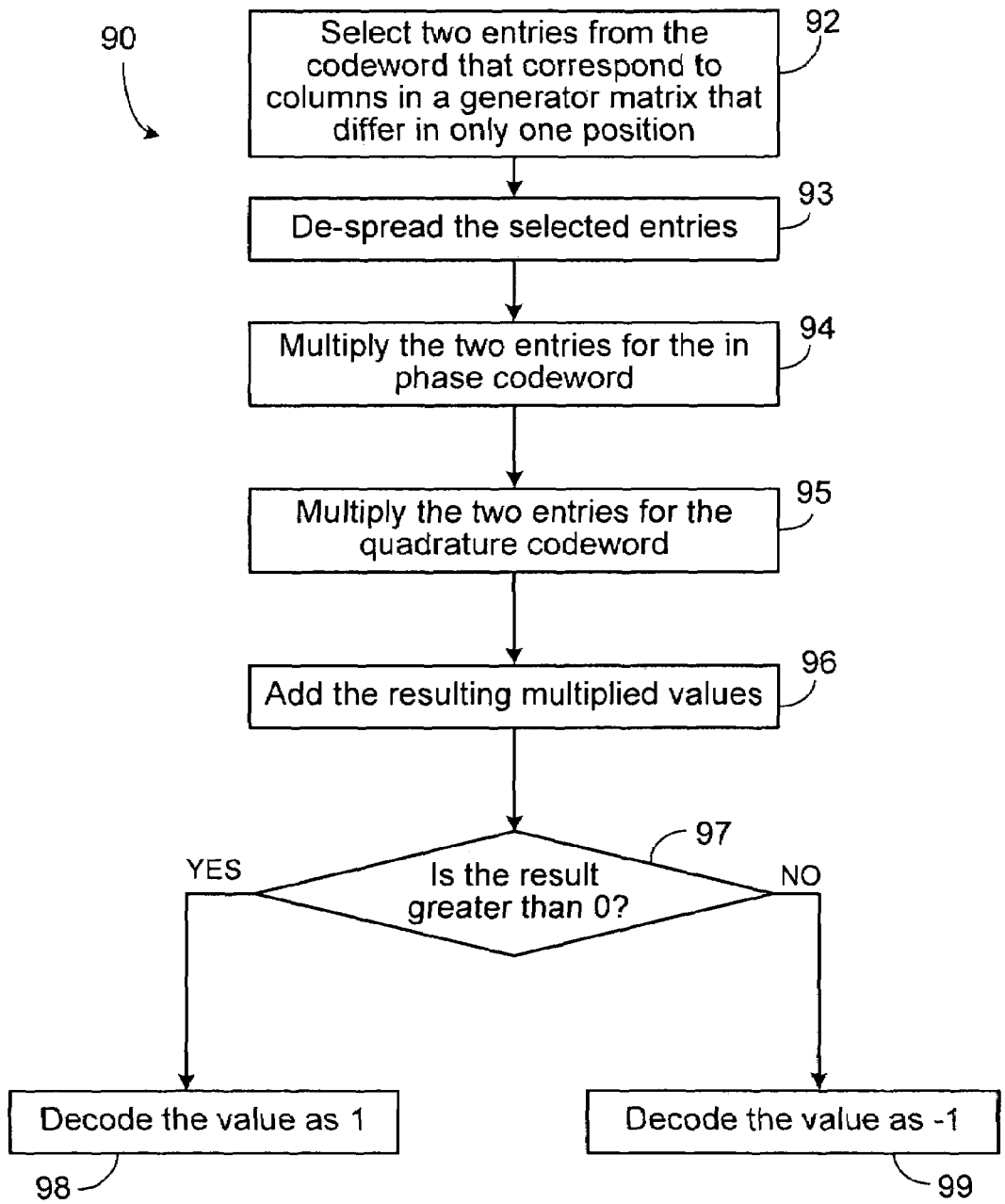
FIG. 6 is a flow chart of a decoding process.
Figure 7:
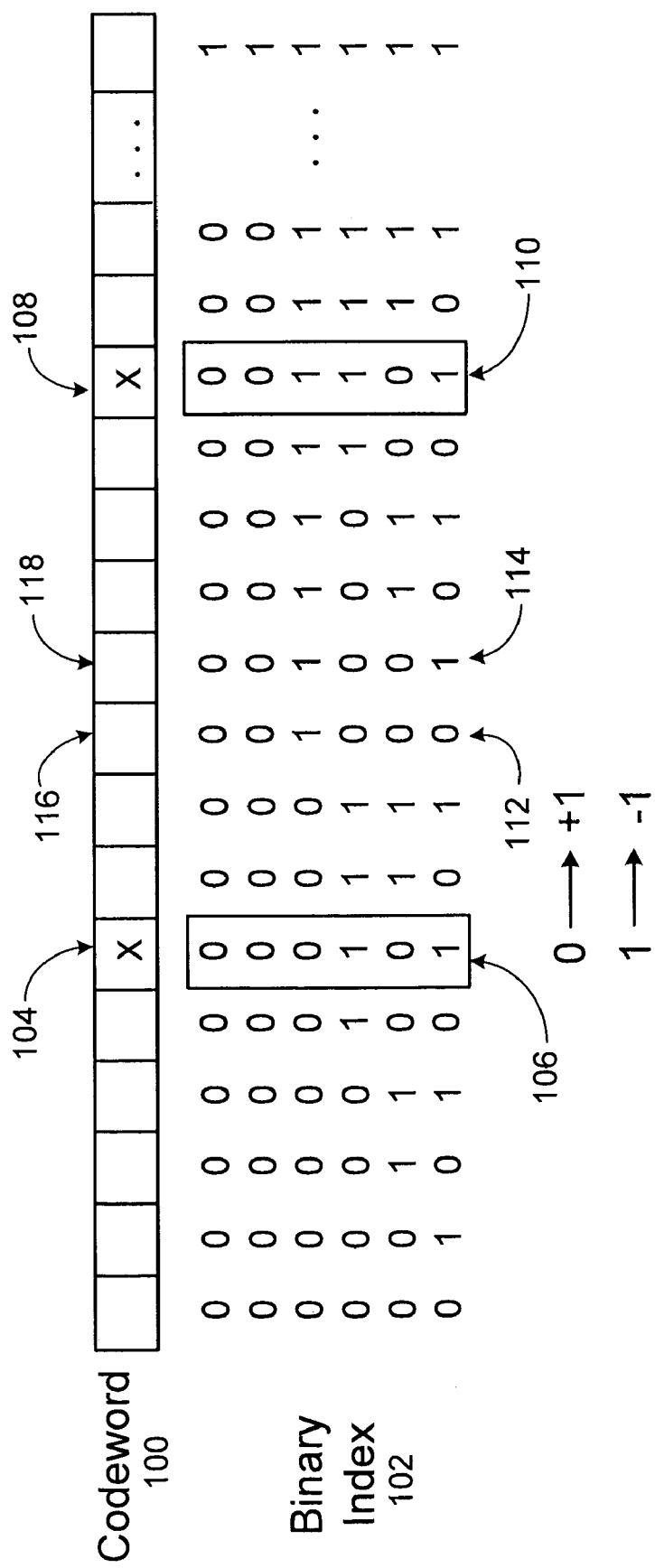
FIG. 7 is a diagram of a codeword and a generator matrix.

FIG. 6, is a flow chart of an embodiment of a process 90 for decoding one bit of a Walsh codeword in a non-coherent system. The receiver 36 selects two entries of the 64-bit codeword that correspond to columns in the generator matrix that differ in only one position (92). For example, as shown in FIG. 7, codeword 100 is sixty-four bits in length and the generator matrix 102 is a matrix whose columns are the sixty-four distinct binary vectors. The properties of generator matrix 102 are used to select two entries of codeword 100 to use to decode one bit of the original data. For example, in order to decode the third bit of the Walsh code, the receiver selects two entries in the codeword 100 that correspond to columns in the generator matrix 102 that differ only in the third position. For example, column 106 which includes the entries of "0 0 0 1 0 1" and column 110 which includes the entries of "0 0 1 1 0 1" in the generator matrix 102 differ in only the $3^{rd}$ bit location. Thus, one exemplary pair of entries in the codeword 100 that could be used to decode the third bit of the Walsh code includes entries 104 and 108 (the entries associated with columns 106 and 110, respectively). In another example, in order to decode the sixth bit of the Walsh code, the receiver selects two entries in the codeword 100 that correspond to columns in the generator matrix 102 that differ only in the sixth position. For example, column 112 which includes the entries of "0 0 1 0 0 0" and column 114 which includes the entries of "0 0 1 0 0 1" in the generator matrix 102 could be selected. Thus, one exemplary pair of entries in the codeword 100 that could be used to decode the sixth bit of the Walsh code includes entries 116 and 118.

Referring back to FIG. 6, after selecting an appropriate pair of entries from the received codeword, the receiver 36 de-spreads the two entries (93). Since only two entries from the codeword are used to decode the bit, the de-spreader only de-spreads the needed entries. De-spreading only a subset of the entries provides the advantage of reducing the computation time needed to de-spread the signal since it is not necessary to de-spread all sixty-four entries from the codeword.

The receiver multiplies the first selected entry for the in-phase codeword (e.g., $c_x \sin(\theta)$) by the second selected entry for the in-phase codeword (e.g., $c_y \sin(\theta)$) resulting in $c_x c_y \sin^2(\theta)$ (94). The receiver 36 multiplies the first selected entry for the quadrature codeword (e.g., $c_x \cos(\theta)$) by the second selected entry for the quadrature codeword (e.g., $c_y \cos(\theta)$) resulting in $c_x c_y \cos^2(\theta)$ (95). The adder 66 in the receiver 36 adds the resulting values resulting in a value of $c_x c_y \cos^2(\theta) + c_x c_y \sin^2(\theta)$ (96). After factoring $c_x c_y \cos^2(\theta) + c_x c_y \sin^2(\theta)$ can be represented as $c_x c_y (\cos^2(\theta) + \sin^2(\theta))$ which equals $c_x c_y$. Based on the properties of the generator matrix used to generate the Walsh codewords, when the entries of the codewords are selected appropriately (e.g., as described above) the value of $c_x c_y$ corresponds to an estimate of the value of one of the originally encoded bits. Thus, the receiver 36 determines if the generated result is greater than zero (97). If the result is greater than zero, the receiver decodes the value as a '1' (98). If the result is less than zero, the receiver decodes the value as a '−1' (99). In another embodiment, if the generated result is greater than zero, the receiver decodes the value as a '−1' and if the generated result is less than zero, the receiver decodes the result as a '1'. This other embodiment is employed if zeros are mapped to '−1' and ones are mapped to '1'.

In some embodiments, the signal-to-noise ratios (SNRs) encountered in the system can be too low to reliably decode a bit by examining only one pair of codeword symbols. In such embodiments, a sum of products of multiple pairs of entries in the codeword can be used to decode one bit. Up to 32 bipolar pairs can be quantized to ±1 to decode one bit in a "soft voting" procedure. In other embodiments, the products of up to 32 bipolar pairs can be added together and then quantized to decode one bit. For example, the local decoding for a particular input bit can use 32 pairs, 16 pairs, 8 pairs, 4 pairs, 2 pairs and 1 pair(s) of codeword entries.

While the examples above describe decoding a single bit of data, the local decoding process can be repeated using different pairs of entries from the codeword to decode additional bits of data.

Generalized Local Decoding

While in the embodiments described above in relation to FIGS. 4-7 the receiver 36 uses one pair of symbols in the Walsh codeword to decode one bit and uses another pair to decode a different bit, in some embodiments it can be beneficial to simultaneously decode multiple bits. Without wishing to be bound by theory, it is believed that jointly decoding multiple input bits by examining a larger number of entries from the received codeword can result in a lower bit error rate in the decoding. In some embodiments, four entries of the sixty-four entries in the codeword can be used to simultaneously decode two bits.

Figure 8:
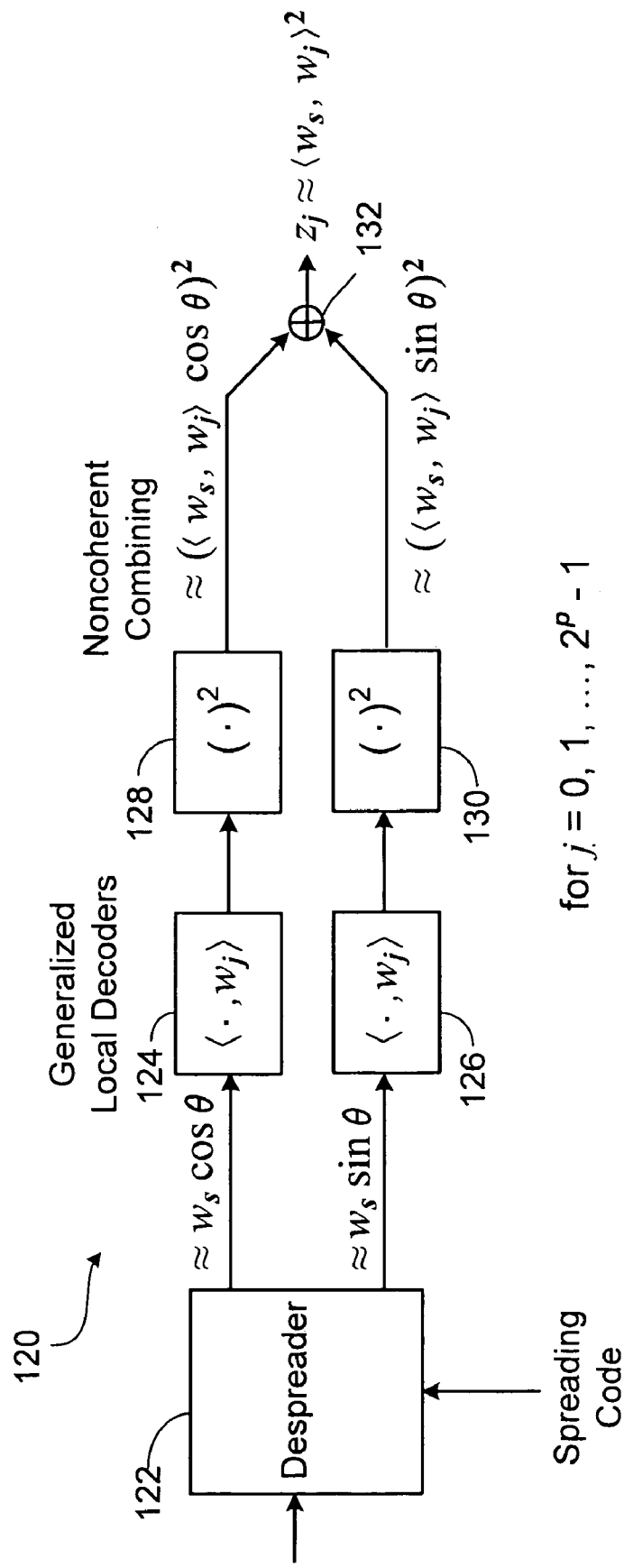
FIG. 8 is a block diagram of exemplary components of a receiver.

FIG. 8 shows a system 120 for decoding multiple bits of the original data simultaneously. System 120 includes a de-spreader 122, a pair of general local decoders 124 and 126, a pair of multipliers 128 and 130, and an adder 132. System 120 decodes multiple bits simultaneously by selecting the appropriate set of entries from the received codeword and performing a fast Hadamard transform (FHT) on the entries.

Figure 9:
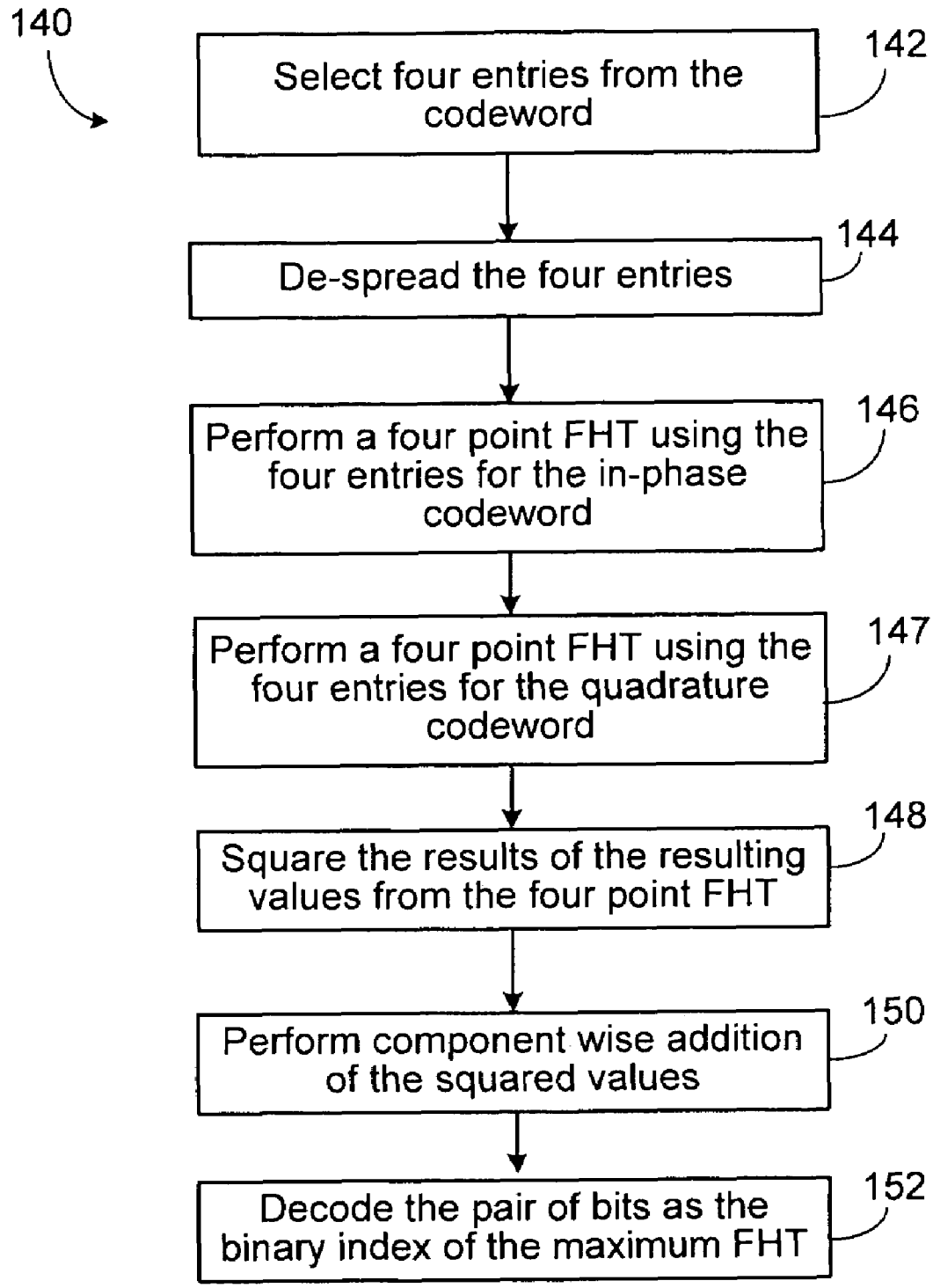
FIG. 9 is a flow chart of a decoding process.

Referring to FIG. 9, an embodiment of a process 140 for decoding Walsh codewords using system 120 is shown. System 120 selects four entries from the received codeword (142). The entries are selected such that the selected group of four symbols in the Walsh codeword can be used to jointly decode two input bits ($x_s$ and $x_t$). The four symbols $c_g$, $c_h$, $c_i$ and $c_j$ used to determine the pair of bits $x_s$ and $x_t$ are chosen such that the binary representations of g, h, i and j in the generator matrix differ only in both the $s^{th}$ and $t^{th}$ bit positions.

Figure 10C:
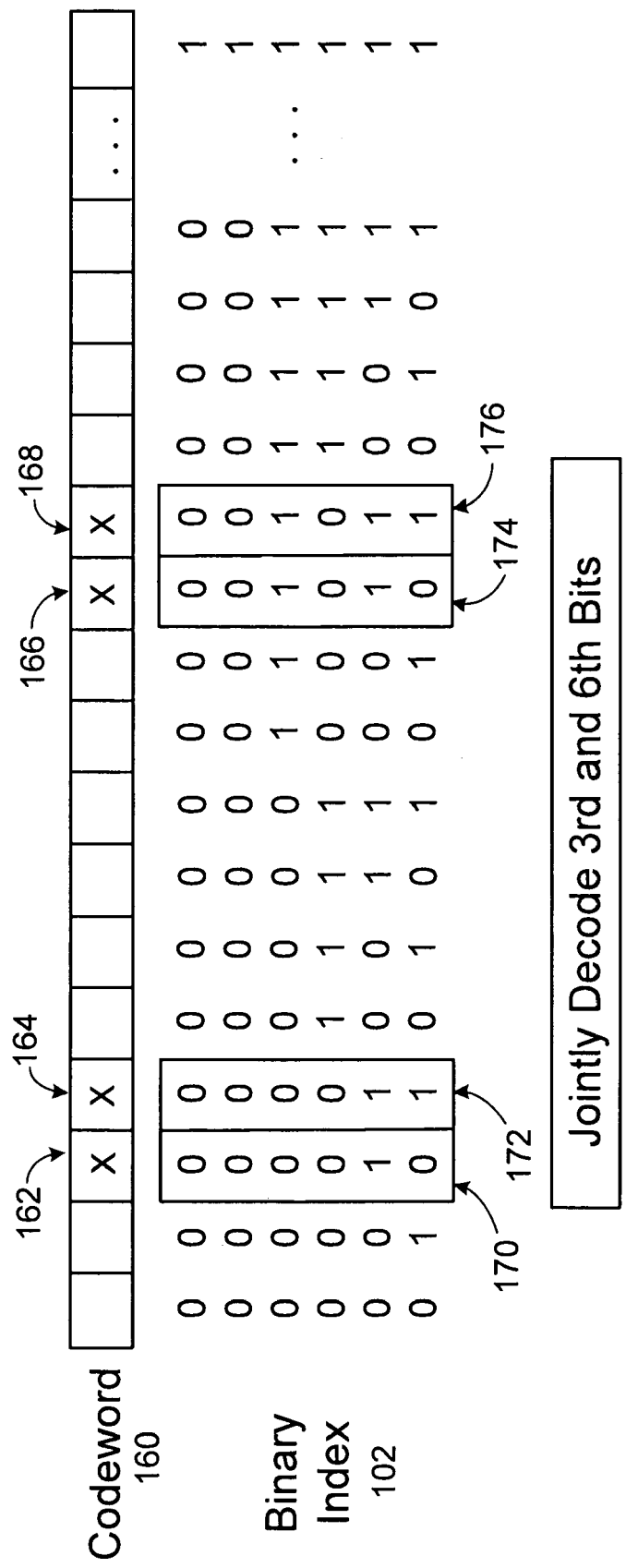
FIG. 10C is a diagram of a codeword and a generator matrix.

FIGS. 10A-10C show an exemplary set of four entries in the Walsh codeword that can be used to decode the third and sixth bits. As shown in FIG. 10A, the four selected entries 162, 164, 166, and 168 from codeword 160 include two pairs of entries that correspond to columns in the generator matrix that differ only in the third bit location. Thus, using the local decoding process described above in FIG. 6, either the pair of entries that includes entry 162 and entry 166 or the pair of entries that includes entry 164 and entry 168 could be used to decode the third bit. As shown in FIG. 10B, the four selected entries 162, 164, 166, and 168 from codeword 160 include two pairs of entries that correspond to columns in the generator matrix that differ only in the sixth bit location. Thus, using the local decoding process described above in FIG. 6, either the pair of entries that includes entry 162 and entry 164 or the pair of entries that includes entry 166 and entry 168 could be used to decode the sixth bit. As shown, in FIG. 10C, since entries 162, 164, 166, and 168 correspond to columns in the generator matrix that differ only in the third and sixth bit locations these four entries can be used to decode both the third and sixth bits simultaneously. Referring back to FIG. 9, after selecting the four entries (142) the de-spreader 122 de-spreads the four entries (144). The de-spread signals are sent to the generalized local decoders 124 and 126 which perform a four point fast Hadamard transform (FHT) operation for the received in-phase and quadrature codewords respectively (146) and (147). The FHT has a butterfly structure similar to the fast Fourier transform (FFT), but the coefficients for the FHT are ±1 rather than complex exponentials. The generalized local decoders 124 and 126 perform the four-point FHT on the four-component vector [$c_g$, $c_h$, $c_i$, $c_j$] where g<h<i<j. Because the received signals are non-coherent, the squarers 128 and 130 square the results of the FHTs (148). The adder 132 adds the squared results for the in-phase and quadrature signals in a component-wise manner (150). Adding the squared results eliminates the dependence of the results on the phase of the received signals (e.g., as described above). For each set of correlation values, the system 120 determines the maximum value and $x_s$ and $x_t$ are decoded as the binary index of the maximum component of the FHT where s<t (152). The chart below shows one exemplary method of determining the values of $x_s$ and $x_t$ based on the four results:

|  | $x_s$ | $x_t$ |
| --- | --- | --- |
| First correlation value is the largest | 0 | 0 |
| Second correlation value is the largest | 0 | 1 |
| Third correlation value is the largest | 1 | 0 |
| Fourth correlation value is the largest | 1 | 1 |

While in the embodiments described above in relation to FIGS. 8-10 four entries from the received codeword were used to simultaneously decode two bits, other numbers of entries can be used to decode multiple bits. For example, groups of 8, 16, and 32 codeword symbols can be used to decode 3, 4, and 5 bits, respectively. In some embodiments, a 64-point FHT can use all sixty-four entries of the Walsh codeword to simultaneously decode all six bits. In some additional embodiments, all six input bits can be decoded using combinations of various-sized FHTs (for example, three 4-point FHTs or two 8-point FHTs).

In some embodiments, multiple groups of codeword symbols can be processed and combined to decode input bits. It is believed that combining the decoded results from multiple groups can increase the reliability of the decoded bits (e.g., decrease the bit error rate). For example, up to $2^{6-p}$ groups of $2^p$ codeword symbols can be used to decode p input bits because there are $2^{6-p}$ choices for the fixed 6–p bits in the binary representation of the codeword symbol indices. As described above, because the reverse link of IS-95 used to send signals from the mobile devices 12 to the base station 20 is noncoherent, the components of the $2^{6-p}$ FHTs are squared before being added component-wise.

Punctured Decoding

While in the embodiments described above one or more groups of entries from the Walsh codeword are used to decode one or more bits, in some embodiments, it can be beneficial to simultaneously decode all six bits. It is believed that all six bits can be jointly decoded based on a subset of less than all of the entries in the received codeword. Since the columns of the generator matrix for the (64, 6) Walsh code include all possible 6-bit binary vectors, any (n,6) binary linear code with n<64 and distinct generator matrix columns can be obtained by puncturing those symbols in the (64, 6) Walsh code that correspond to unwanted columns in the generator matrix. Puncturing is the elimination of symbols corresponding to the same position in all codewords of the code. For example, in some embodiments, thirty-two entries of the sixty-four entries in the codeword can be used to simultaneously decode all six bits.

Figure 11:
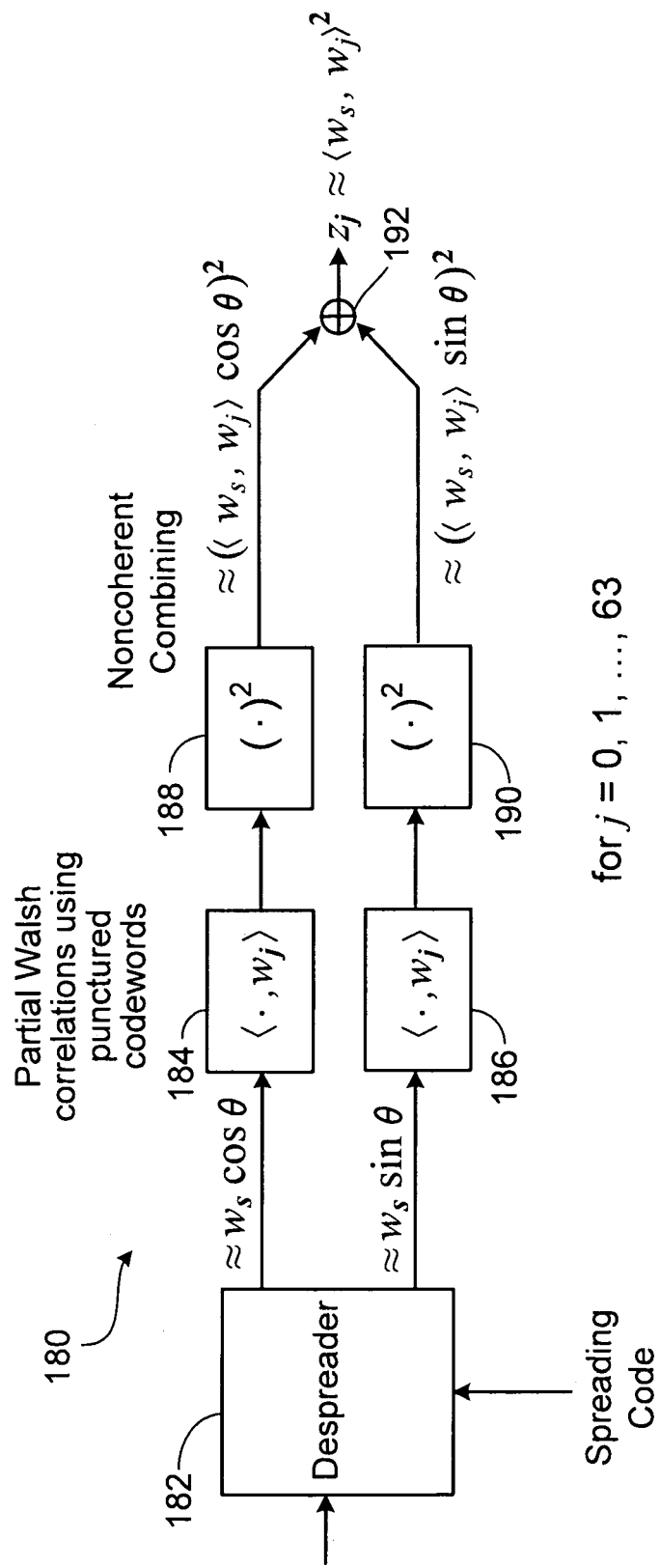
FIG. 11 is a block diagram of exemplary components of a receiver.

FIG. 11 shows a system 180 for decoding all six bits of the codeword simultaneously using a non-coherent punctured decoding process. System 180 includes a de-spreader 182, a pair of partial Walsh correlators 184 and 186, a pair of squarers 188 and 190, and an adder 192. System 180 decodes the six bits simultaneously by puncturing out some of the entries from the received codeword and performing partial Walsh correlation on the remaining subset of entries from the received codeword.

Figure 12:
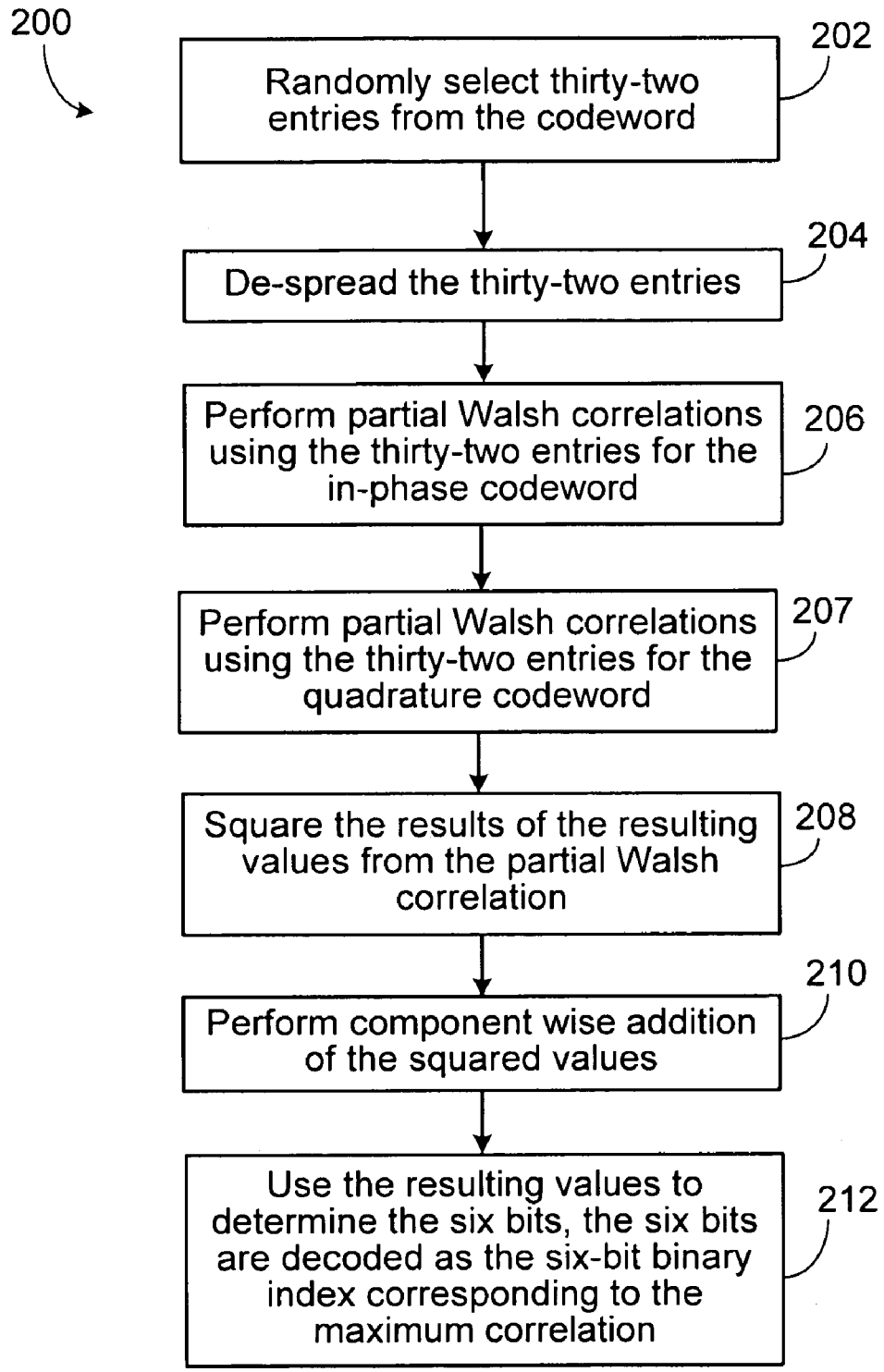
FIG. 12 is a flow chart of a decoding process.

FIG. 12 shows an embodiment of a punctured decoding process 200. The system 180 selects thirty-two entries from the codeword (202) and the de-spreader 182 de-spreads the selected entries (204). Since only a set of fewer than all of the entries from the codeword are used to decode the six bits, the de-spreader only decodes the needed entries. De-spreading only a subset of the entries provides the advantage of reducing the computation time needed to de-spread the signal since it is not necessary to de-spread all sixty-four entries from the codeword.

The correlators 184 and 186 perform partial Walsh correlations using the thirty-two de-spread entries for the received in-phase and quadrature codewords respectively (206) and (207).

After the partial Walsh correlations are performed, the multipliers 188 and 190 square the results of the partial Walsh correlations (208). The adder 192 adds the squared results in a component-wise manner (210) for the in-phase and quadrature codewords to eliminate the dependence of the results on the phase of the received signals (e.g., as described above). System 180 uses the resulting values to determine each of the six bits of the codeword. The six bits are decoded as the 6 bit binary index corresponding to the maximum correlation (212). For example, if the 64 partial Walsh correlations are labeled with indices from 0 to 63 inclusive, and if it is determined that the index associated with the maximum partial Walsh correlation is 34, then the six bits are decoded as '1 0 0 0 1 0.'

Figure 13:
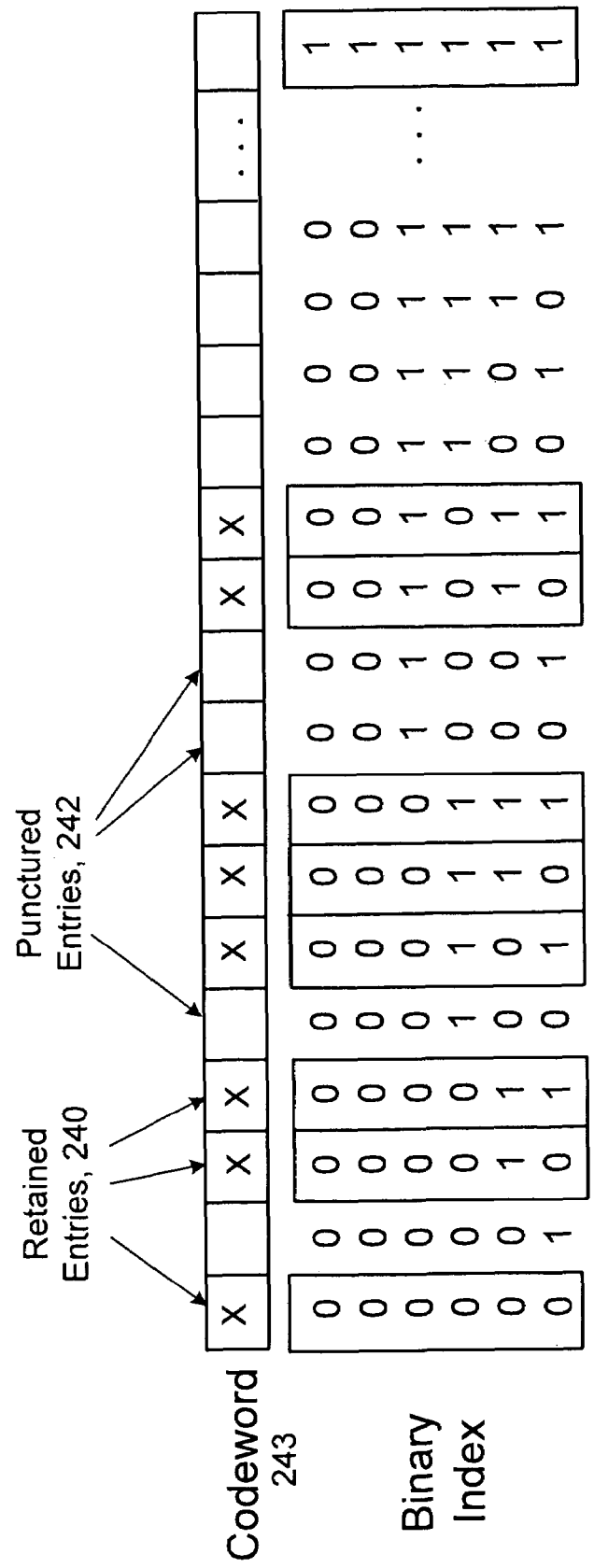
FIG. 13 is a diagram of a codeword and a generator matrix.

FIG. 13 shows a codeword 243 and an exemplary set of entries 240 retained in a received codeword after puncturing and a set of punctured entries 242 that are not retained. In FIG. 13, the retained entries 240 are indicated by an 'x' in the codeword entry. The retained entries 240 (and not the punctured entries 242) are used to decode the bits of the codeword.

While in the embodiments described above, thirty-two entries in the received codeword are selected and used to decode the Walsh codeword, other numbers of entries could be used.

In some embodiments, the partial Walsh correlations are implemented by FHTs by replacing punctured entries in the received codeword with zeroes.

The subset of retained entries may be chosen in a variety of ways. In one embodiment, the entries are randomly selected. In other embodiments, the entries can be selected based on particular features of the generator matrix. For a given n<64, the set of all possible (n,6) linear codes created by distinct puncturing patterns has a wide range of bit error rates. For example, some (n,6) codes have a row of zeros in their generator matrices and thus have a minimum Hamming distance of zero, while others maximize the minimum distance. In non-coherent systems such as IS-95, the (n,6) code that maximizes the minimum distance does not necessarily lead to the best bit error rate, and in some embodiments can even lead to performance worse than randomly choosing a (n,6) code. In some embodiments, an appropriate criterion for selecting a (n,6) code for a non-coherent system is to maximize the minimum distance and simultaneously minimize the maximum distance.

Adaptive Subcode-Based Walsh Decoding

In general, the larger the number of entries from the codeword that are used to decode the Walsh code, the lower the bit error rate and the greater the computational complexity. Thus, a tradeoff exists between reducing the bit error rate and reducing the computational complexity.

In some embodiments, the signal to noise ratio of a channel is unknown and/or can vary over time. For example, in a wireless channel such as the IS-95 reverse link encounters, large fluctuations in instantaneous signal-to-noise ratio are observed. In some embodiments, the fluctuations due to path loss and shadowing are partially mitigated by open-loop and closed-loop power control. However, rapid signal to noise ratio fluctuations due to multi-path fading can exist, especially at high mobile speeds.

Using the decoding techniques described herein, a variety of operating points provide a tradeoff between bit error rate and computational complexity at a fixed signal-to-noise ratio. However, in some systems (e.g., see FIG. 1), the signal to noise ratio of a signal received from the mobile 12 at the base station 20 is unknown. If the signal to noise ratio is unknown, a minimum acceptable bit error rate can be used to determine how to perform the decoding to achieve an acceptable bit error rate. For example, the system can test a series of suboptimal Walsh decoding algorithms with operating points that simultaneously move towards higher computational complexity and lower bit error rates until the target bit error rate is achieved.

Figure 14:
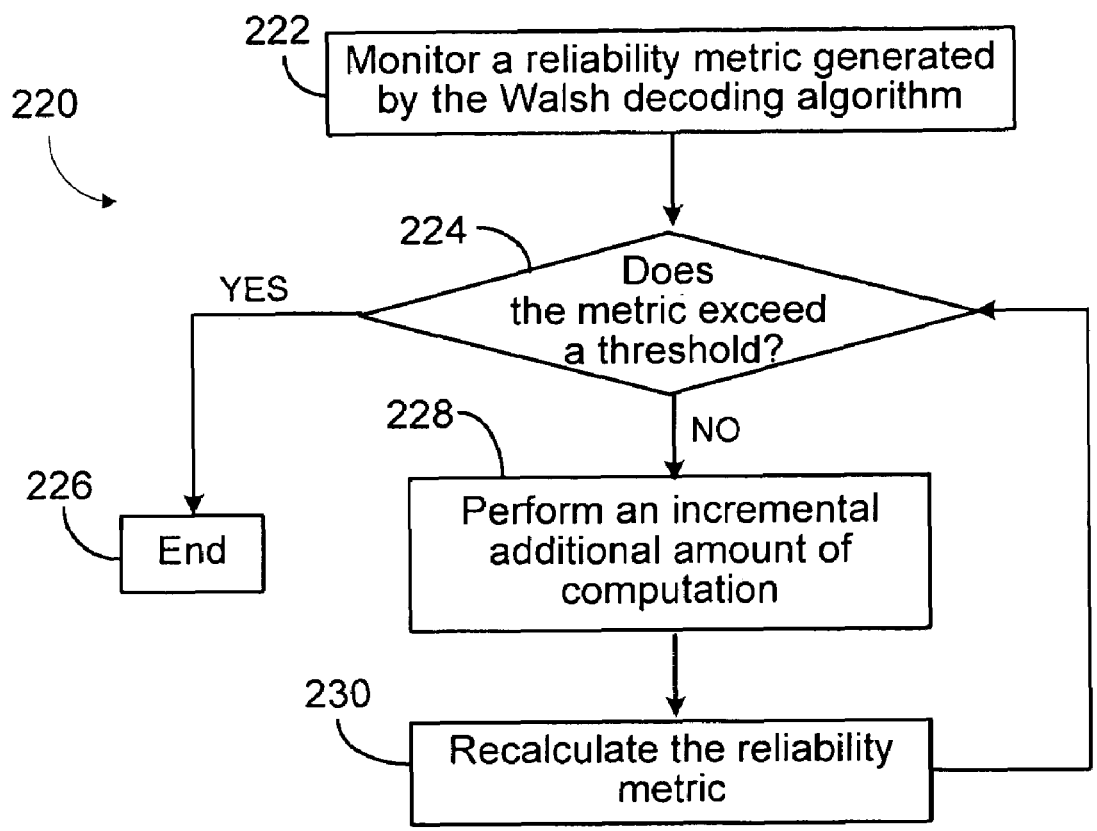
FIG. 14 is a flow chart of a process for increasing computational complexity to achieve a desired reliability.

Referring to FIG. 14, a process 220 for iteratively increasing the computational complexity to achieve a desired bit error rate is shown. The decoding system monitors a reliability metric generated by the Walsh decoding algorithm (222) and determines if the metric exceeds a threshold associated with the desired bit error rate (224). If the metric exceeds the threshold (e.g., the bit error rate is likely to be within an acceptable range), the system does not perform additional computations to determine the Walsh code bit(s) (226). If the metric does not exceed the threshold (e.g., the bit error rate is likely to be outside of the acceptable range), the system performs an incremental amount of computation (228). The incremental amount of computation uses a slightly more complex technique and therefore, adds to the computational complexity of the decoding. After performing the incremental amount of computation, the system recalculates the reliability metric (230). The system iteratively performs additional computation (228), recalculates the metric (230) and determines if the metric exceeds the threshold (224), until an acceptable bit error rate is achieved. The threshold may also be altered based on information such as the number of iterations of metric recalculation that have occurred in the attempted decoding of a given codeword.

Figure 15:
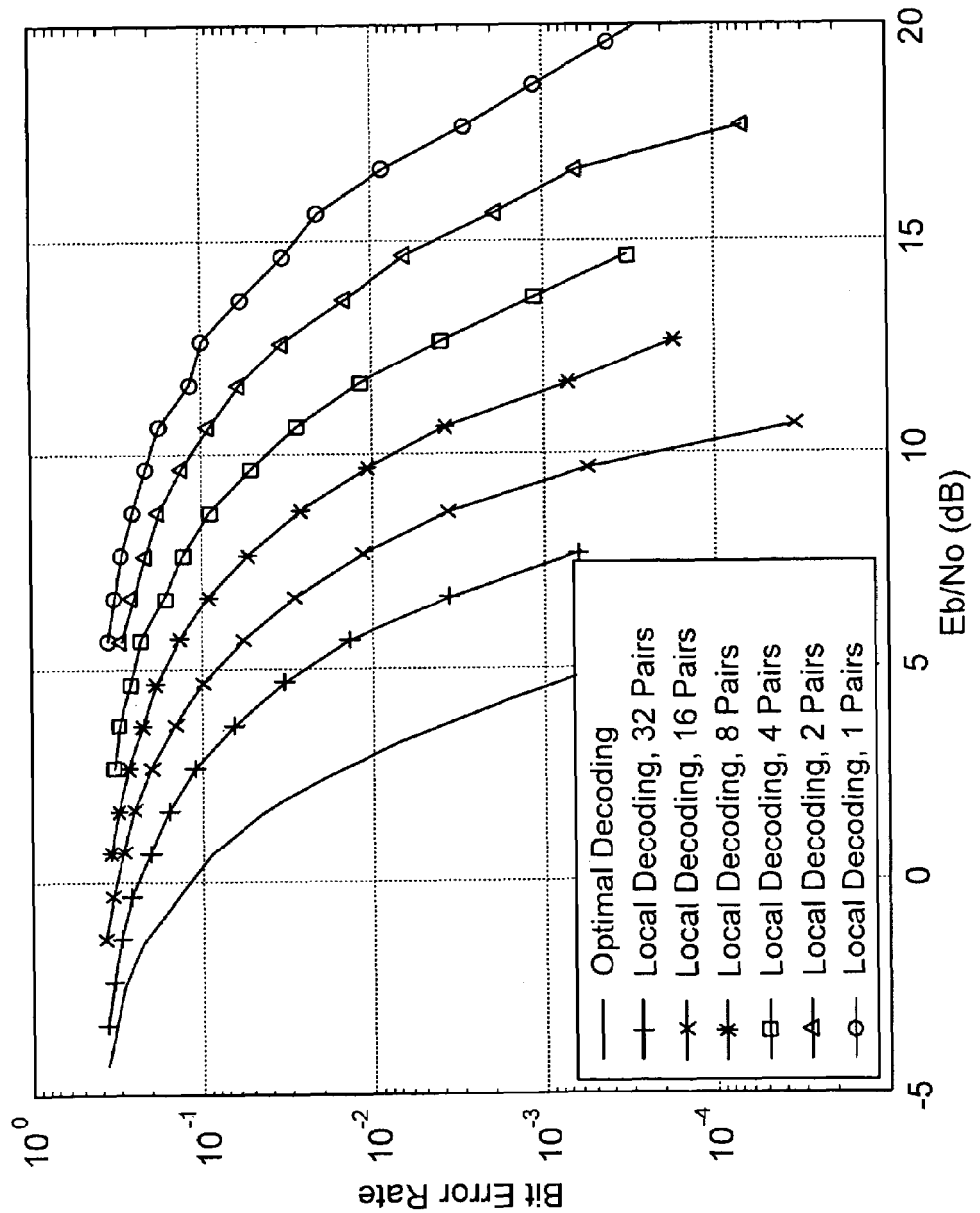
FIG. 15 is a graph of a bit error rate for decoding Walsh codewords based on different computational complexities.

Referring to FIG. 15, a graph of the bit error rate (as shown on the y-axis) versus the signal-to-noise ratio (as shown on the x-axis) for various decoding complexities (represented by the different curves) is shown. The graph demonstrates the tradeoff between bit error rate and the computational complexity for local decoding of Walsh codewords. As described above in relation to FIGS. 4-7, in the local decoding of Walsh codes, two symbols $c_i$ and $c_j$ used to determine the bit $x_t$ are chosen such that the binary representations of i and j differ only in the $t^{th}$ bit position. In this algorithm, increasing the number of pairs of entries in the received codeword that are used to decode a particular bit increases the reliability (e.g., decreases the bit error rate).

Figure 16:
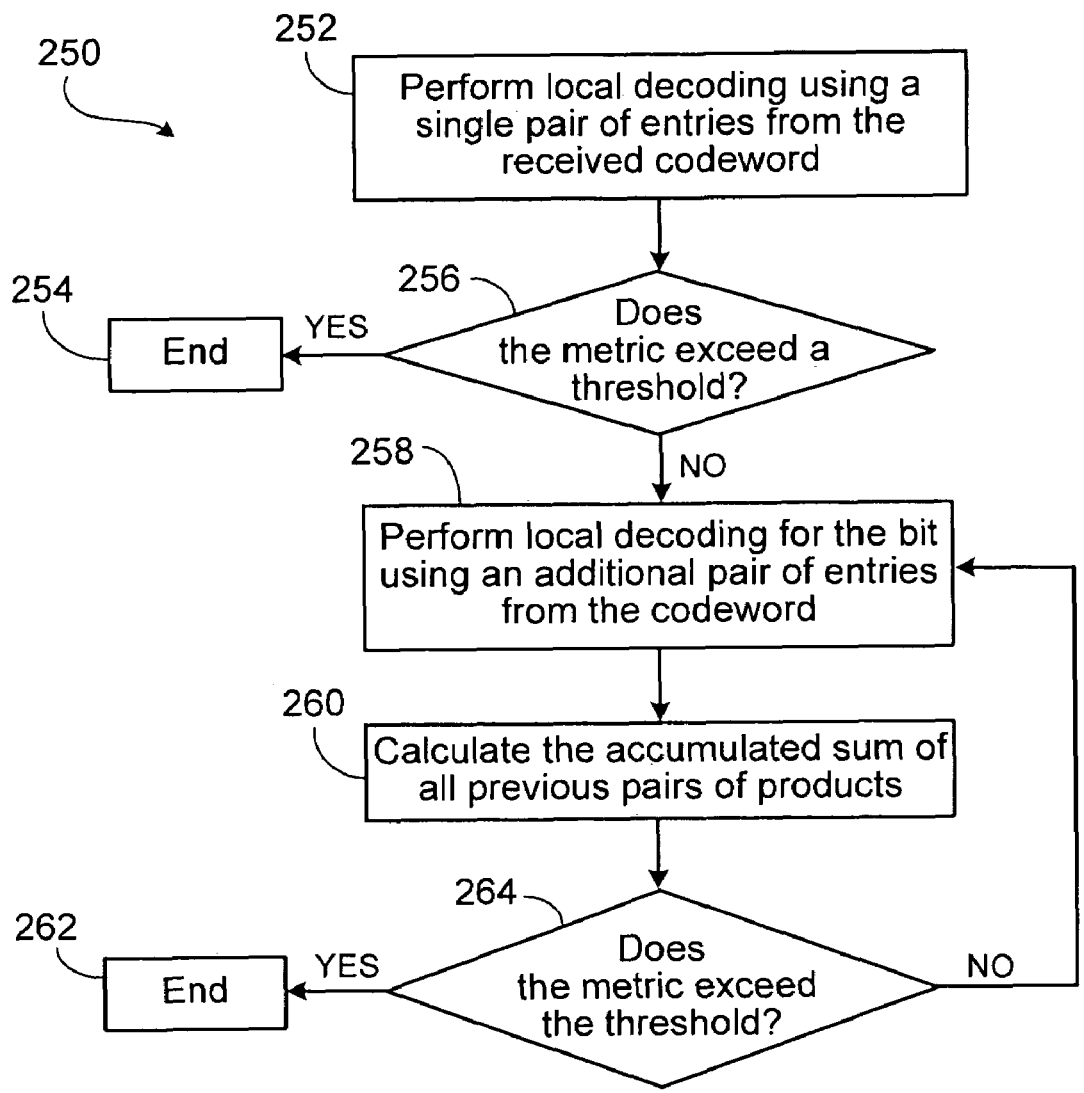
FIG. 16 is a flow chart of a process for increasing computational complexity to achieve a desired reliability.

Referring to FIG. 16, a process 250 for iteratively increasing the computational complexity of a local decoding algorithm to achieve a desired bit error rate is shown. The system selects a first pair of entries from the codeword and performs local decoding (e.g., as described in FIGS. 4-7) to determine the value of one bit of the Walsh codeword (252). After completing the initial decoding based on a single pair of entries, the system determines if a performance metric exceeds a threshold value (256). An exemplary performance metric can be the absolute value of the quantity computed in the combination of multiplied in phase and quadrature entries referred to in block 96 of FIG. 6. If the performance metric exceeds the threshold value, the system does not perform additional computations to decode the bit (254). On the other hand, if the performance metric does not exceed the threshold, the system performs local decoding for the bit using an additional, different pair of entries from the codeword (258). The system calculates the accumulated sum of the all previous pairs of products from the first decoding and the second decoding to generate a revised performance metric (260) and determines if the revised performance metric exceeds the threshold (264). If the revised performance metric exceeds the threshold, the system does not perform additional computations to decode the bit (262). On the other hand if the revised performance metric does not exceed the threshold value, the system iteratively repeats performing additional decoding until the performance metric exceeds the threshold value.

Figure 17:
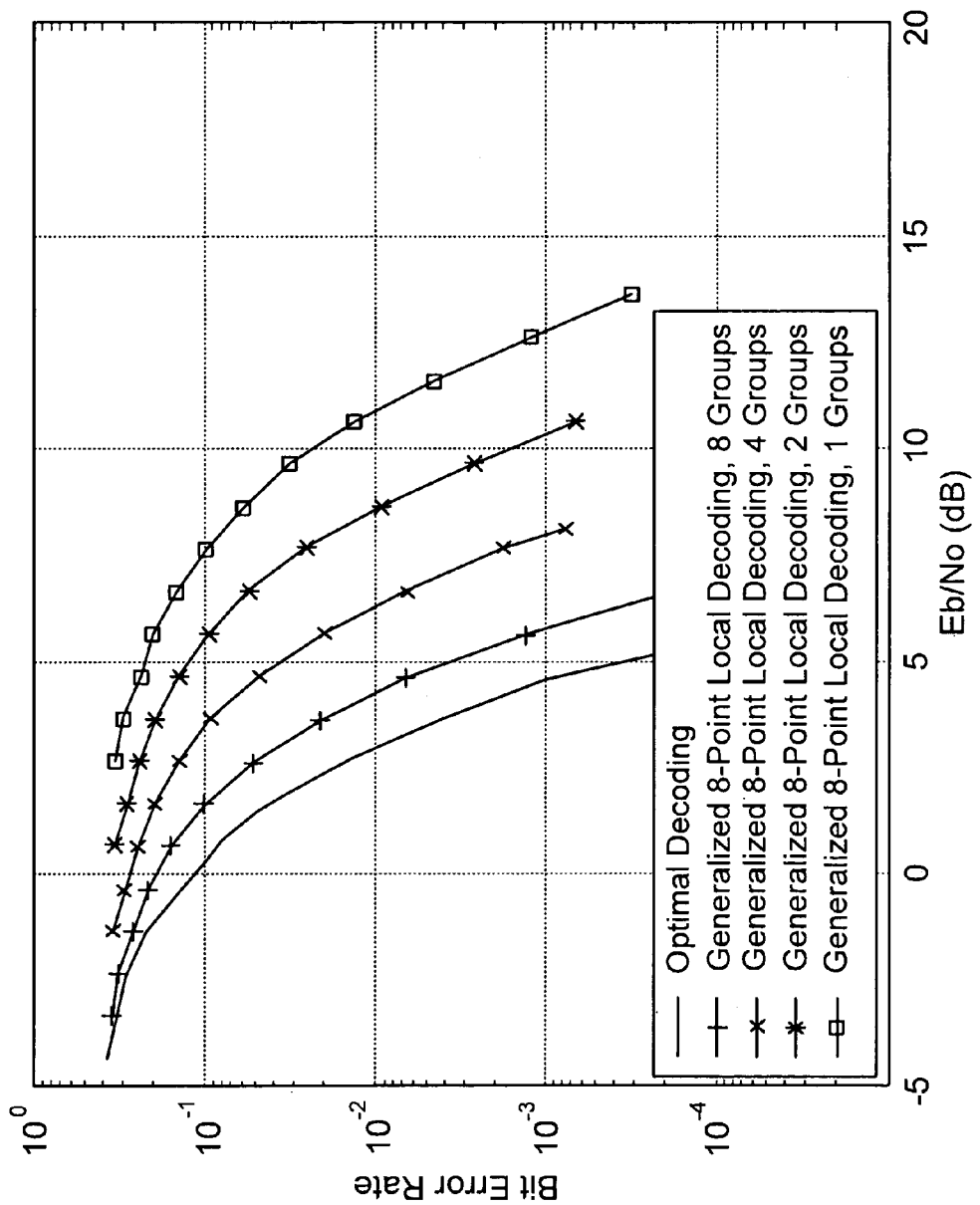
FIG. 17 is a graph of a bit error rate for decoding Walsh codewords based on different computational complexities.

Referring to FIG. 17, a graph of the bit error rate (as shown on the y-axis) versus the signal-to-noise ratio (as shown on the x-axis) for various decoding complexities (represented by the different curves) is shown. The graph demonstrates the tradeoff between bit error rate and the computational complexity for generalized local decoding of Walsh codewords. As described above in relation to FIGS. 8-10, in the generalized local decoding of Walsh codes, multiple bits of the Walsh code are decoded simultaneously using multiple entries from the codeword. For example, four entries from the Walsh codeword can be used to decode two bits, eight entries from the Walsh codeword can be used to decode three bits, sixteen entries from the Walsh codeword can be used to decode four bits, etc. The entries from the Walsh codeword are selected such that the selected group of entries in the Walsh codeword can be used to jointly decode the input bits and are chosen such that the binary representations of the entry indices differ in the desired bit locations. Increasing the number of groups of entries in the received codeword that are used to decode a particular set of bits increases the reliability (e.g., decreases the bit error rate).

Figure 18:
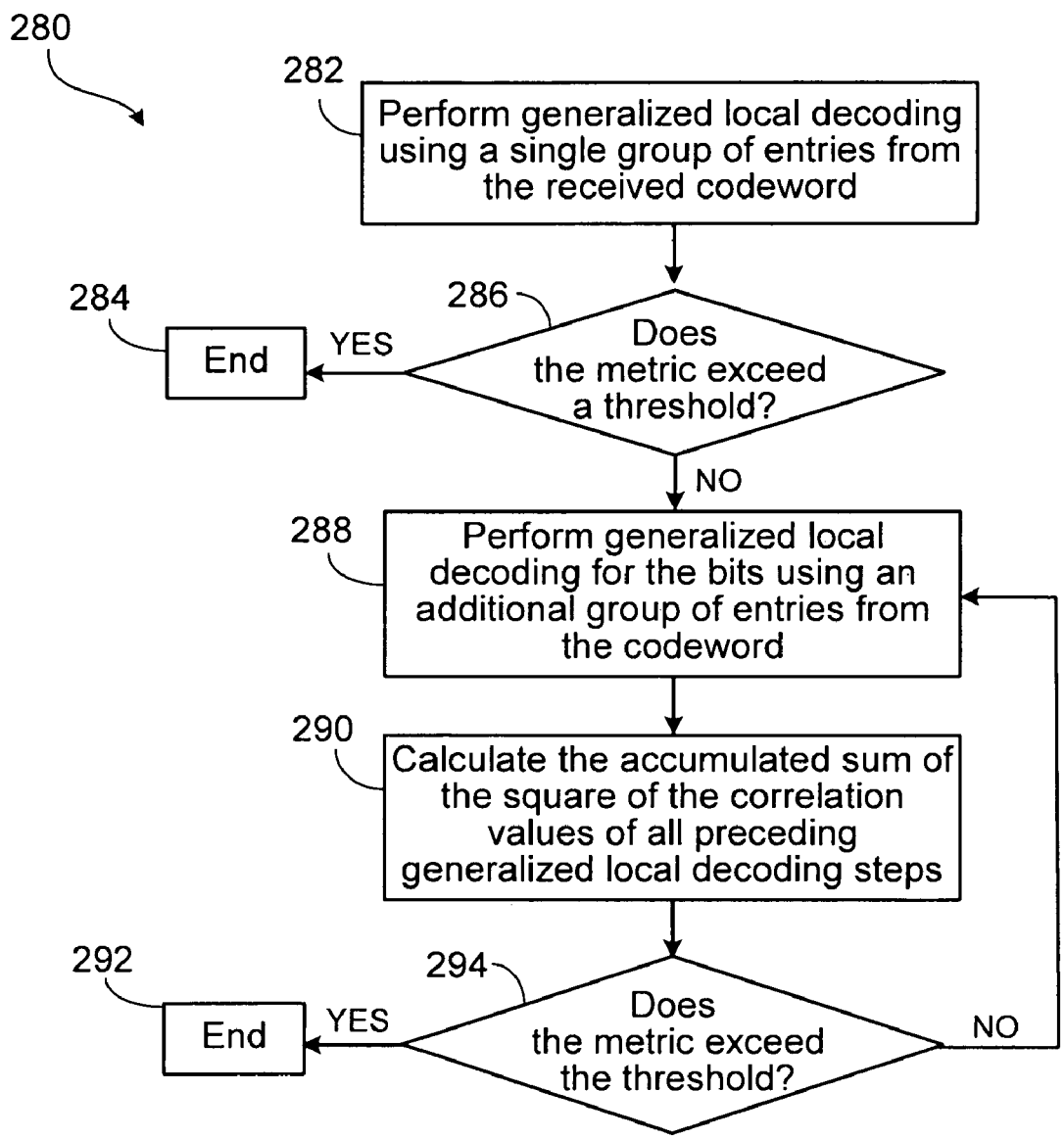
FIG. 18 is a flow chart of a process for increasing computational complexity to achieve a desired reliability.

Referring to FIG. 18, a process 280 for iteratively increasing the computational complexity of a generalized local decoding process to achieve a desired bit error rate is shown. The system selects a first set of entries from the codeword and performs generalized local decoding (e.g., as described in FIGS. 8-10) to determine the value of multiple bits of the Walsh codeword (282). After completing the initial decoding based on a single group of entries, the system determines if a performance metric (based on 150 of FIG. 9) exceeds a threshold value (286). If the performance metric exceeds the threshold value, the system does not perform additional computations to decode the set of bits (284). On the other hand, if the performance metric does not exceed the threshold, the system performs generalized local decoding for the set of bits using an additional, different set of entries from the codeword (288). The system combines the results of the first decoding and the second decoding to generate a revised performance metric (290) and determines if the revised performance metric exceeds the threshold (294). If the revised performance metric exceeds the threshold, the system does not perform additional computations to decode the set of bits (292). On the other hand if the revised performance metric does not exceed the threshold value, the system iteratively repeats performing additional decoding until the accumulated performance metric exceeds the threshold value.

For example, in order to simultaneously decode three bits of the Walsh code, a set of eight entries from the received codeword are used to perform an FHT. This 8-stage algorithm increments the number of 8-point FHTs used to decode three of the six input bits until the metrics for the three bits all exceed a threshold. When each additional 8-point FHT is used, the squared correlations are added to the sum of squared correlations of the 8-point FHTs already used. The metric for each bit, for the purposes algorithm termination, is the absolute difference between the maximum sum of squared correlations over all three-bit input patterns with a zero in that bit position and the maximum sum of squared correlations over all those patterns with a one in that bit position.

Figure 19:
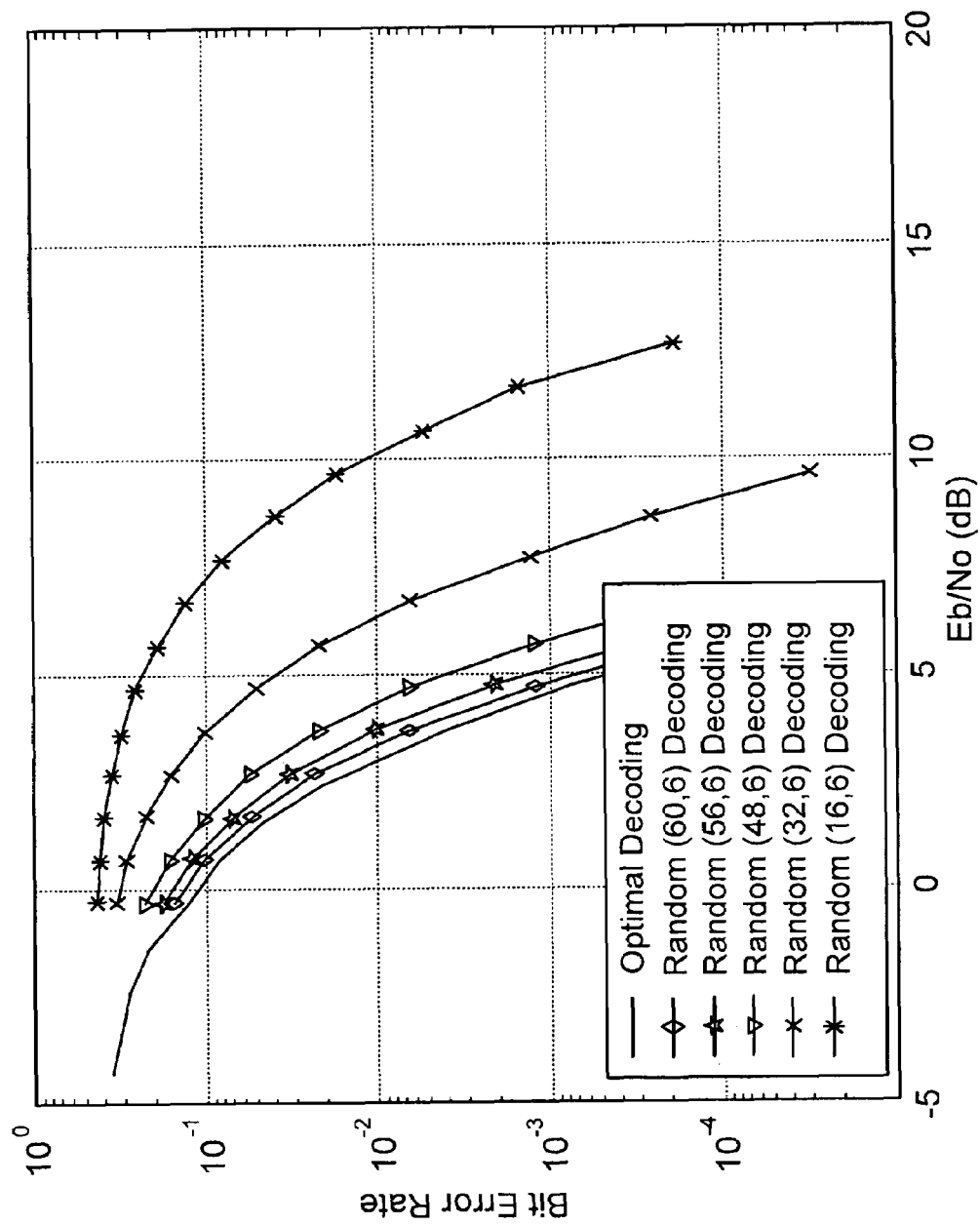
FIG. 19 is a graph of a bit error rate for decoding Walsh codewords based on different computational complexities.

Referring to FIG. 19, a graph of the bit error rate (as shown on the y-axis) versus the signal-to-noise ratio (as shown on the x-axis) for various decoding complexities (represented by the different curves) is shown. The graph demonstrates the tradeoff between bit error rate and the computational complexity for punctured decoding of Walsh codewords. As shown in the graph, increases in the computational complexity (e.g., decoding based on a greater number of entries from the Walsh codeword) result in corresponding decreases in the bit error rate. As described above, in the punctured decoding of Walsh codes, all six bits of the Walsh code are decoded simultaneously using multiple (e.g., 16, 32, 48, 56, 60, etc.), selected entries from the codeword. Increasing the total number of entries from the codeword used in the decoding increases the reliability (e.g., decreases the bit error rate).

Figure 20:
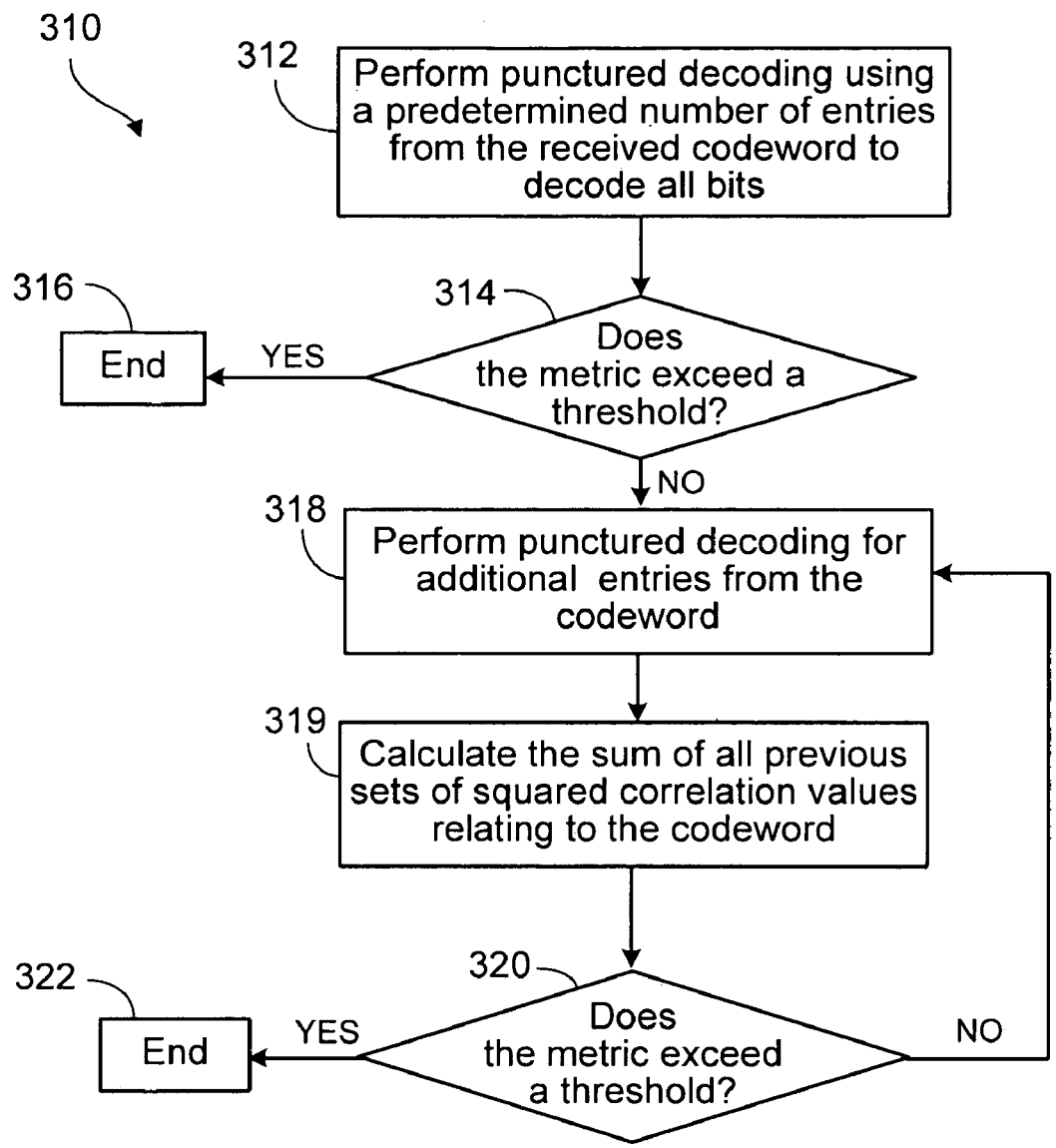
FIG. 20 is a flow chart of a process for increasing computational complexity to achieve a desired reliability.

Referring to FIG. 20, a process 310 for iteratively increasing the computational complexity of a punctured decoding process to achieve a desired bit error rate is shown. The system selects a first set of entries from the codeword and performs punctured decoding (e.g., as described in FIGS. 11-13) to determine the value of each of the bits of the Walsh codeword (312). After completing the initial decoding based on the first set of selected entries, the system determines if a performance metric exceeds a threshold value (314). An exemplary performance metric for each bit, for the purposes of stopping the algorithm, is the absolute difference between the maximum squared correlation over all six-bit input patterns with a zero in that bit position and the maximum squared correlation over all those patterns with a one in that bit position. If the performance metric exceeds the threshold value, the system does not perform additional computations to decode the bit (316). On the other hand, if the performance metric does not exceed the threshold, the system performs punctured decoding for an additional set of selected entries from the codeword (318) and calculates the sum of all previous sets of squared correlation values relating to the codeword (319). Based on the calculated sum, the system determines if the revised performance metric exceeds the threshold (320). If the revised performance metric exceeds the threshold, the system does not perform additional computations to decode the bits (322). On the other hand if the revised performance metric does not exceed the threshold value, the system iteratively repeats performing additional decoding until the performance metric exceeds the threshold value.

Other implementations are within the scope of the following claims:

What is claimed is:

1. A method comprising:
   receiving, at a base station, a Walsh codeword from a mobile device, the Walsh codeword comprising a plurality of entries and each entry representing a plurality of bits to clarify that the plurality of bits are the bits positioned at each column of the entries in binary index of a generator matrix, but not the bits or symbols of the Walsh codeword; and
   estimating at least one bit of the plurality of bits based on a set of fewer than all of the entries of the Walsh codeword.

2. The method of claim 1, further comprising de-spreading at least some of the entries of the Walsh codeword.

3. The method of claim 2, wherein de-spreading the at least some of the entries of the Walsh codeword comprises de-spreading fewer than all of the entries of the Walsh codeword.

4. The method of claim 2, wherein de-spreading the at least some of the entries of the Walsh codeword comprises multiplying the entries by a mobile-specific code.

5. The method of claim 1, wherein the received Walsh codeword comprises a non-coherent signal.

6. The method of claim 1, wherein receiving the Walsh codeword from the mobile device comprises:
   receiving an in-phase component of the Walsh codeword; and
   receiving a quadrature component of the Walsh codeword.

7. The method of claim 1, wherein estimating the at least one bit of the plurality of bits comprises estimating a single bit based on two de-spread entries from the Walsh codeword.

8. The method of claim 7, wherein only two entries of the Walsh codeword are de-spread.

9. The method of claim 1, wherein estimating the at least one bit of the plurality of bits comprises estimating p bits based on $2^P$ de-spread entries from the Walsh codeword, p being an integer.

10. The method of claim 1, wherein estimating the at least one bit of the plurality of bits comprises estimating two bits based on four de-spread entries from the Walsh codeword.

11. The method of claim 1, wherein estimating the at least one bit of the plurality of bits comprises estimating three bits based on eight de-spread entries from the Walsh codeword.

12. The method of claim 1, further comprising:
   selecting a first entry from the plurality of entries included in the Walsh codeword, the first entry being associated with a first column in a generator matrix;
   selecting a second entry from the plurality of entries included in the Walsh codeword, the second entry being associated with a second column in the generator matrix, the second column differing from the first column by a single bit; and
   de-spreading the first and second entries.

13. The method of claim 12, wherein estimating the at least one bit of the plurality of bits comprises multiplying the first entry and the second entry.

14. The method of claim 13, wherein:
   receiving the Walsh codeword from the mobile device comprises:
      receiving an in-phase component of the Walsh codeword; and
      receiving a quadrature component of the Walsh codeword; and
   multiplying the first entry and the second entry comprises:
      multiplying the first entry from the in-phase component by the second entry from the in-phase component to generate an in-phase multiplication result; and
      multiplying the first entry from the quadrature component by the second entry from the quadrature component to generate a quadrature multiplication result.

15. The method of claim 14, wherein estimating the at least one bit of the plurality of bits comprises:
   adding the in-phase and quadrature multiplication results.

16. The method of claim 1, wherein estimating the at least one bit of the plurality of bits comprises simultaneously estimating two bits of the plurality of bits based on four de-spread entries from the Walsh codeword.

17. The method of claim 16, further comprising:
   selecting a first entry from the plurality of entries included in the Walsh codeword, the first entry being associated with a first column in a generator matrix;
   selecting a second entry from the plurality of entries included in the Walsh codeword, the second entry being associated with a second colunm in the generator matrix, selecting a third entry from the plurality of entries included in the Walsh codeword, the third entry being associated with a third column in the generator matrix, selecting a fourth entry from the plurality of entries included in the Walsh codeword, the fourth entry being associated with a fourth column in the generator matrix, the first, second, third, and fourth columns in the generator matrix differing in two bit locations; and de-spreading the first, second, third, and fourth entries.

18. The method of claim 16, wherein:

receiving the Walsh codeword from the mobile device comprises:
  receiving an in-phase component of the Walsh codeword; and
  receiving a quadrature component of the Walsh codeword; and estimating the at least one bit of the plurality of bits comprises:
  performing a fast Hadamard transform (FHT) on the in-phase and quadrature components of selected bits to generate a first in-phase result, a second in-phase result, a third in-phase result, a fourth in-phase result, a first quadrature result, a second quadrature result, a third quadrature result, and a fourth quadrature result.

19. The method of claim 18, further comprising:

squaring the first in-phase result to generate a first squared in-phase output;

squaring the second in-phase result to generate a second squared in-phase output;

squaring the third in-phase result to generate a third squared in-phase output;

squaring the fourth in-phase result to generate a fourth squared in-phase output;

squaring the first quadrature result to generate a first squared quadrature output;

squaring the second quadrature result to generate a second squared quadrature output;

squaring the third quadrature result to generate a third squared quadrature output;

squaring the fourth quadrature result to generate a fourth squared quadrature output;

adding the first squared in-phase output and the first squared quadrature output;

adding the second squared in-phase output and the second squared quadrature output;

adding the third squared in-phase output and the third squared quadrature output; and adding the fourth squared in-phase output and the fourth squared quadrature output.

20. The method of claim 1, wherein estimating the at least one bit of the plurality of bits comprises simultaneously estimating six bits of the plurality of bits based on de-spread entries from the Walsh codeword.

21. The method of claim 1, further comprising:
  selecting a predetermined number of entries from the Walsh codeword; and
  de-spreading only the predetermined number of entries.

22. The method of claim 21, wherein selecting the predetermined number of entries from the Walsh codeword comprises randomly selecting the predetermined number of entries from the Walsh codeword.

23. The method of claim 21, wherein the predetermined number of entries comprises at most about sixteen entries.

24. The method of claim 21, wherein the predetermined number of entries comprises at most about thirty-two entries.

25. The method of claim 21, wherein the predetermined number of entries comprises at most about sixty-four entries.

26. The method of claim 21, wherein estimating six bits of the plurality of bits comprises performing a fast Hadamard transform (FHT) on the predetermined number of entries.

27. The method of claim 1, further comprising:
  generating a reliability metric based on the estimated at least one bit of the plurality of bits; and
  comparing the reliability metric to a threshold.

28. The method of claim 27, further comprising:
  iteratively re-estimating the at least one bit of the plurality of bits if the reliability metric does not meet the threshold.

29. The method of claim 28, further comprising:
  altering the threshold based on a number of times the at least one bit of the plurality of bits has been re-estimated.

30. The method of claim 1, wherein the base station and the mobile device communicate using an IS-95 protocol.

31. A system comprising:
  a receiver configured to receive a Walsh codeword from a mobile device, the Walsh codeword comprising a plurality of entries and each entry representing a plurality of bits to clarify that the plurality of bits are the bits positioned at each column of the entries in binary index of a generator matrix, but not the bits or symbols of the Walsh codeword; and
  a processor configured to estimate at least one bit of the plurality of bits based on a set of fewer than all of the entries of the Walsh codeword.

32. The system of claim 31, wherein the processor is further configured to de-spread fewer than all of the entries of the Walsh codeword.

33. The system of claim 31, wherein the processor is configured to estimate p bits based on $2^P$ de-spread entries from the Walsh codeword, p being an integer.

34. The system of claim 31, wherein the processor is configured to simultaneously estimate six bits of the plurality of bits based on the de-spread entries from the Walsh codeword.

* * * * *